United States Patent
Wang et al.

(10) Patent No.: US 9,944,780 B2
(45) Date of Patent: Apr. 17, 2018

(54) HETEROPHASIC PROPYLENE COPOLYMER WITH LOW EXTRACTABLES

(71) Applicant: BOREALIS AG, Vienna (AT)

(72) Inventors: Jingbo Wang, Linz (AT); Petar Doshev, Linz (AT); Markus Gahleitner, Neuhofen/Krems (AT); Pauli Leskinen, Helsinki (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/127,444

(22) PCT Filed: Apr. 1, 2015

(86) PCT No.: PCT/EP2015/057200
§ 371 (c)(1),
(2) Date: Sep. 20, 2016

(87) PCT Pub. No.: WO2015/150467
PCT Pub. Date: Oct. 8, 2015

(65) Prior Publication Data
US 2017/0145199 A1    May 25, 2017

(30) Foreign Application Priority Data
Apr. 4, 2014 (EP) .................................. 14163575

(51) Int. Cl.
*C08L 23/10* (2006.01)
*C08L 23/14* (2006.01)

(52) U.S. Cl.
CPC ........... *C08L 23/14* (2013.01); *C08L 2203/10* (2013.01); *C08L 2205/025* (2013.01); *C08L 2207/02* (2013.01); *C08L 2310/00* (2013.01)

(58) Field of Classification Search
CPC .. C08L 23/14; C08L 2203/10; C08L 2207/02; C08L 2207/025; C08L 2310/00
See application file for complete search history.

(56) References Cited

U.S. PATENT DOCUMENTS

2010/0280166 A1* 11/2010 Nenseth et al. ...... C08F 210/16
524/528

FOREIGN PATENT DOCUMENTS

| EP | 0 887 379 | 12/1998 | | |
|---|---|---|---|---|
| EP | 1 860 147 | 11/2007 | | |
| EP | 2 143 760 | 1/2010 | | |
| EP | 2 182 030 | 5/2010 | | |
| EP | 2546298 | 1/2013 | | |
| EP | 2546298 A1 * | 1/2013 | ........... | C08F 210/06 |
| EP | 2 557 118 | 2/2013 | | |
| JP | 2002504953 | 2/2002 | | |
| JP | 2013523900 | 6/2013 | | |
| RU | 2446181 | 3/2012 | | |
| WO | 92/12182 | 7/1992 | | |
| WO | 99/24478 | 5/1999 | | |
| WO | 99/24479 | 5/1999 | | |
| WO | 00/68315 | 11/2000 | | |
| WO | 01/48034 | 7/2001 | | |
| WO | 03/051934 | 6/2003 | | |
| WO | 2004/000899 | 12/2003 | | |
| WO | 2004/111095 | 12/2004 | | |
| WO | 2005/023891 | 3/2005 | | |
| WO | 2006/069733 | 7/2006 | | |
| WO | 2009/077034 | 6/2009 | | |
| WO | 2010/052263 | 5/2010 | | |
| WO | 2012/028252 | 3/2012 | | |
| WO | 2012/159927 | 11/2012 | | |
| WO | 2013/007650 | 1/2013 | | |
| WO | 2013/041507 | 3/2013 | | |
| WO | 2013/083461 | 6/2013 | | |

OTHER PUBLICATIONS

European Search Report for Application No. 14163575.5-1301 dated Aug. 29, 2014, 9 pgs.
Resconi, et al., "Propene Polymerization with Metallocene," Chemical Reviews, 2000, vol. 100, No. 4, p. 1263.
International Preliminary Report on Patentability for International Application No. PCT/EP2015/057200 dated Mar. 16, 2016, 28 pages.
International Search Report and Written Opinion for International Application No. PCT/EP2015/057200 dated Jun. 23, 2015, 13 pages.
Notice of Reasons for Rejection for Japanese Patent Application No. 2016-556712 dated May 9, 2017, 7 pgs.
An English Translation of a Russian Office Action issue in Russian Patent Application No. 2016141292/04(066036) dated Oct. 27, 2017, 5 pages.

\* cited by examiner

*Primary Examiner* — Nathan M Nutter
(74) *Attorney, Agent, or Firm* — Lowenstein Sandler LLP

(57) ABSTRACT

Heterophasic propylene copolymer comprising a propylene-$C_4$ to $C_{12}$ α-olefin copolymer as a matrix in which an ethylene-propylene rubber is dispersed, said heterophasic propylene copolymer has good mechanical properties and low extractables.

18 Claims, No Drawings

HETEROPHASIC PROPYLENE COPOLYMER WITH LOW EXTRACTABLES

CROSS-REFERENCE TO RELATED APPLICATION(S)

This application is a national phase of International Application No. PCT/EP2015/057200, filed on Apr. 1, 2015, which claims the benefit of European Patent Application No. 14163575.5, filed on Apr. 4, 2014. The contents of these applications are hereby incorporated by reference in their entirety.

The present invention relates to a new heterophasic propylene copolymer (RAHECO) to its preparation as well as to articles made therefrom.

In the area of packaging polypropylene plays an important role. Quite often so called heterophasic polypropylene, i.e. a semi-crystalline polypropylene matrix in which a rubber is dispersed, is used. Such material provides good stiffness and impact; however optical properties may depend very much on the correct adjustment of the dispersion of the rubber in the matrix. Further the amorphous part may cause high amount of extractables. However packaging material, especially in food industry or for medical/healthcare products, need to have low extractables. On the other hand as mentioned packaging material must be of course mechanically stable. A further key aspect of such material is its optical performance, i.e. must have acceptable haze values. Some required properties behave in a contradicting manner, i.e. improving one property lowers the performance of another property.

Hence it is an object of the present invention to provide a polypropylene with low extractables being mechanically stable and have good optical properties.

The finding of the present invention is a heterophasic propylene copolymer having a propylene-$C_4$ to $C_{12}$ α-olefin copolymer as a matrix and an elastomeric propylene ethylene copolymer dispersed in said matrix. Preferably said elastomeric propylene ethylene copolymer has a rather high content of ethylene.

Accordingly the present invention is directed to a heterophasic propylene copolymer (RAHECO) comprising
(i) a matrix (M) being a propylene-$C_4$ to $C_{12}$ α-olefin copolymer (C-PP), said propylene-$C_4$ to $C_{12}$ α-olefin copolymer (C-PP) comprises units derivable from
(i.1) propylene and
(i.2) at least one $C_4$ to $C_{12}$ α-olefin; and
(ii)) an elastomeric propylene copolymer (EC) dispersed in said matrix (M), said elastomeric propylene copolymer (EC) comprises units derivable from
(ii).1) propylene and
(ii.2) ethylene and optionally at least one $C_4$ to $C_{12}$ α-olefin;
said heterophasic propylene copolymer (RAHECO) has
(a) a melt flow rate $MFR_2$ (230° C.) measured according to ISO 1133 in the range of 2.5 to 200.0 g/10 min;
(b) a total comonomer content in the range of 12.0 to 35.0 wt.-%;
(c) a xylene cold soluble (XCS) fraction determined according to ISO 16152 (25° C.) in an amount of 10.0 to 40.0 wt.-%;
wherein further the propylene copolymer (RAHECO) fulfills
(d) the in-equation (I)

$$\frac{C2(total)}{Cx(total)} > 1.0 \quad (I)$$

wherein
C2(total) is the ethylene content [in wt.-%] of the heterophasic propylene copolymer (RAHECO);
Cx(total) is the $C_4$ to $C_{12}$ α-olefin content [in wt.-%] of the heterophasic propylene copolymer (RAHECO).

From the wording of the previous paragraph comes apparent that the propylene-$C_4$ to $C_{12}$ α-olefin copolymer (C-PP) and the elastomeric propylene copolymer (EC) are chemically different. Accordingly it is preferred that the propylene-$C_4$ to $C_{12}$ α-olefin copolymer (C-PP) does not comprise units derivable from ethylene. More preferably the propylene-$C_4$ to $C_{12}$ α-olefin copolymer (C-PP) contains only one type of $C_4$ to $C_{12}$ α-olefin. On the other hand the elastomeric propylene copolymer (EC) is preferably an ethylene-propylene rubber (EPR).

Preferably the ethylene content [in wt.-%] of the total heterophasic propylene copolymer (RAHECO) is in the range of 12.0 to 33.0 wt.-% and/or the $C_4$ to $C_{12}$ α-olefin content [in wt.-%] of the total heterophasic propylene copolymer (RAHECO) is in the range of 0.5 to 6.0 wt.-%.

The heterophasic propylene copolymer of this invention is especially featured by the properties of the xylene cold soluble (XCS) fraction as well as by the xylene cold insoluble (XCI) fraction. Accordingly the xylene cold soluble (XCS) fraction of the heterophasic propylene copolymer (RAHECO) has a total comonomer content and/or ethylene content based on the weight of the xylene cold soluble (XCS) fraction in the range of 30 to 90 wt.-% and/or an intrinsic viscosity (IV) determined according to DIN ISO 1628/1 (in Decalin at 135° C.) of at least 1.2 dl/g.

In one preferred embodiment the xylene cold in-soluble (XCI) fraction of the heterophasic propylene copolymer (RAHECO) has a total comonomer content [in wt.-%] based on the weight of the xylene cold in-soluble (XCI) fraction in the range of 3.0 to 12.0 wt.-% and/or has an ethylene content [in wt.-%] based on the total weight of the xylene cold in-soluble (XCI) fraction in the range of 2.0 to 11.0 wt.-% and/or an $C_4$ to $C_{12}$ α-olefin content [in wt.-%] based on the total weight of the xylene cold in-soluble (XCI) fraction in the range of 0.5 to 6.0 wt.-%.

Still more preferably the xylene cold in-soluble (XCI) fraction of the heterophasic propylene copolymer (RAHECO) fulfills the in-equation (II)

$$\frac{C2(XCI)}{Cx(XCI)} > 1.0 \quad (II)$$

wherein
C2(XCI) is the ethylene content [in wt.-%] of the xylene cold in-soluble (XCI) fraction of the heterophasic propylene copolymer (RAHECO);
Cx(XCI) is the $C_4$ to $C_{12}$ α-olefin content [in wt.-%], preferably the 1-hexene content [in wt.-%], of the xylene cold in-soluble (XCI) fraction of the heterophasic propylene copolymer (RAHECO).

In one further preferred aspect the heterophasic propylene copolymer (RAHECO) according to this invention fulfills
(a) the in-equation (III)

$$\frac{C(XCS)}{C(total)} \geq 1.5 \quad (III)$$

wherein
C(XCS) is the total comonomer content [in wt.-%] of the xylene cold soluble (XCS) fraction of the heterophasic propylene copolymer (RAHECO);

C(total) is the total comonomer content [in wt.-%] of the total heterophasic propylene copolymer (RAHECO);

and/or (b) the in-equation (IV)

$$\frac{C2(XCS)}{C2(\text{total})} \geq 1.7 \quad \text{(IV)}$$

wherein

C2(XCS) is the ethylene content [in wt.-%] of the xylene cold soluble (XCS) fraction of the heterophasic propylene copolymer (RAHECO);

C2(total) is the ethylene content [in wt.-%] of the total heterophasic propylene copolymer (RAHECO);

and/or (c) the in-equation (V)

$$\frac{C2(XCS)}{C(XCI)} \geq 4.5 \quad \text{(V)}$$

wherein

C2(XCS) is the ethylene content [in wt.-%] of the xylene cold soluble (XCS) fraction of the heterophasic propylene copolymer (RAHECO);

C(XCI) is the total comonomer content [in wt.-%] of the xylene cold in-soluble (XCI) fraction of the heterophasic propylene copolymer (RAHECO);

and/or (d) the in-equation (VI)

$$\frac{C2(XCS)}{C2(XCI)} \geq 5.0 \quad \text{(VI)}$$

wherein

C2(XCS) is the ethylene content [in wt.-%] of the xylene cold soluble (XCS) fraction of the heterophasic propylene copolymer (RAHECO);

C2(XCI) is the ethylene content [in wt.-%] of the xylene cold in-soluble (XCI) fraction of the heterophasic propylene copolymer (RAHECO).

Preferably the matrix (M) of the heterophasic propylene copolymer (RAHECO) of the present invention comprises two different polymer fractions. Accordingly it is preferred that the propylene-$C_4$ to $C_{12}$ α-olefin copolymer (C-PP) comprises, preferably consists of, a first polypropylene fraction (PP1) and a second propylene-$C_4$ to $C_{12}$ α-olefin copolymer fraction (C-PP2), preferably wherein further the weight fraction between the first polypropylene fraction (PP1) and the second propylene-$C_4$ to $C_{12}$ α-olefin copolymer fraction (C-PP2) [(PP1)/(C-PP2)] is in the range of 30/70 to 70/30.

Preferably the comonomer content, preferably the $C_4$ to $C_{12}$ α-olefin content, [in wt-%] in the propylene-$C_4$ to $C_{12}$ α-olefin copolymer (C-PP) is higher than in the first polypropylene fraction (PP1) and/or the comonomer content, preferably the $C_4$ to $C_{12}$ α-olefin content, between the first polypropylene fraction (PP1) and the propylene-$C_4$ to $C_{12}$ α-olefin copolymer (C-PP) differ by at least 1.5 wt-% and/or the comonomer content, preferably the $C_4$ to $C_{12}$ α-olefin content, between the first polypropylene fraction (PP1) and the second propylene-$C_4$ to $C_{12}$ α-olefin copolymer fraction (C-PP2) differ by at least 2.5 wt-%.

Still more preferably the first polypropylene fraction (PP1) is a propylene homopolymer fraction (H-PP1) or especially preferred the first polypropylene fraction (PP1) is a first propylene-$C_4$ to $C_{12}$ α-olefin copolymer fraction (C-PP1), preferably said first propylene-$C_4$ to $C_{12}$ α-olefin copolymer fraction (C-PP1) has a $C_4$ to $C_{12}$ α-olefin content in the range of 0.5 to 4.0 wt.-%.

In turn it is preferred that the second propylene-$C_4$ to $C_{12}$ α-olefin copolymer fraction (C-PP2) has a $C_4$ to $C_{12}$ α-olefin content in the range of 2.0 to 15.0 wt.-%. Thus in one specific embodiment the propylene-$C_4$ to $C_{12}$ α-olefin copolymer (C-PP) has a comonomer content, preferably a $C_4$ to $C_{12}$ α-olefin content, in the range of 1.5 to 9.0 wt.-%.

Preferably the elastomeric propylene copolymer (EC) of the heterophasic propylene copolymer (RAHECO) has a comonomer content, preferably ethylene content, in the range of 40 to 90 wt.-%.

In one preferred embodiment the heterophasic propylene copolymer (RAHECO) fulfills in-equation (VII)

$$\frac{C(\text{total})}{XCS} \geq 1.0 \quad \text{(VII)}$$

wherein

C(XCS) is the total comonomer content [in mol-%] of the heterophasic propylene copolymer (RAHECO);

XCS is the content [in wt.-%] of the xylene cold soluble (XCS) fraction of the heterophasic propylene copolymer (RAHECO).

In yet another embodiment the heterophasic propylene copolymer (RAHECO) according to this invention has a first glass transition temperature Tg(1) and a second glass transition temperature Tg(2), wherein said first glass transition temperature Tg(1) is above the second glass transition temperature Tg(2), preferably the difference between the first glass transition temperature Tg(1) and second glass transition temperature Tg(2) is at least 20° C. Preferably the first glass transition temperature Tg(1) is in the range of −5 to +12° C. and/or the second glass transition temperature Tg(2) is in the range of −45 to −25° C.

In one aspect of the invention the heterophasic propylene copolymer (RAHECO) is α-nucleated.

Preferably the heterophasic propylene copolymer (RAHECO) has (a) a tensile modulus measured according to ISO 527-1 of at least 500 MPa, and/or (b) a hexane extractable content determined according to FDA method on cast films of 100 μm of below 3.0 wt.-%.

The invention is also directed to an article comprising the heterophasic propylene copolymer (RAHECO) as defined herein, preferably said article is selected from the group consisting of (medical) pouches, food packaging articles, films and bottles.

Finally the invention describes also a process for the preparation of a heterophasic propylene copolymer (RAHECO) as defined herein polymerizing:

(I) propylene and an $C_4$ to $C_{12}$ α-olefin, preferably 1-hexene, so as to form the matrix (M) being the propylene-$C_4$ to $C_{12}$ α-olefin copolymer (C-PP); and subsequently polymerizing (II) propylene and ethylene optionally at least one $C_4$ to $C_{12}$ α-olefin, preferably in the gas phase, so as to form the elastomeric propylene copolymer (EC) dispersed in said matrix (M);

wherein both steps (I) and (II) take place in the presence of the same single site solid particulate catalyst preferably free from an external carrier, more preferably a catalyst comprising
(i) a transition metal compound of formula (I)

$$R_n(Cp')_2MX_2 \qquad (I)$$

wherein
"M" is zirconium (Zr) or hafnium (Hf),
each "X" is independently a monovalent anionic σ-ligand,
each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'),
"n" is 1 or 2, preferably 1, and
(ii) a cocatalyst comprising a compound of a group 13 metal, e.g. Al or boron compound.

More preferably step (I) comprises polymerizing propylene and optionally an $C_4$ to $C_{12}$ α-olefin, preferably 1-hexene, so as to form the first polypropylene fraction (PP1) and subsequently polymerizing in another reactor propylene and $C_4$ to $C_{12}$ α-olefin, preferably 1-hexene, so as to form the second propylene-$C_4$ to $C_{12}$ α-olefin copolymer fraction (C-PP2), the first polypropylene fraction (PP1) and the second propylene-$C_4$ to $C_{12}$ α-olefin copolymer fraction (C-PP2) form the propylene-$C_4$ to $C_{12}$ α-olefin copolymer n (C-PP).

In the following the first and second embodiment will be described in more detail together.

The present invention is directed to a heterophasic propylene copolymer (RAHECO). More precisely the present invention is directed to a heterophasic propylene copolymer (RAHECO) comprising a matrix (M) being a propylene-$C_4$ to $C_{12}$ α-olefin copolymer (C-PP) and dispersed therein an elastomeric propylene copolymer (EC). Thus the matrix (M) contains (finely) dispersed inclusions being not part of the matrix (M) and said inclusions contain the elastomeric propylene copolymer (EC). The term "inclusion" according to this invention shall preferably indicate that the matrix and the inclusion form different phases within the heterophasic propylene copolymer (RAHECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic propylene copolymer (RAHECO) according to this invention comprises as polymer components only the propylene-$C_4$ to $C_{12}$ α-olefin copolymer (C-PP) and the elastomeric propylene copolymer (EC). In other words, the heterophasic propylene copolymer (RAHECO) may contain further additives but no other polymer in an amount exceeding 5.0 wt.-%, more preferably exceeding 3.0 wt.-%, like exceeding 1.0 wt.-%, based on the total heterophasic propylene copolymer (RAHECO). One additional polymer which may be present in such low amounts is a polyethylene which is a by-reaction product obtained by the preparation of the heterophasic propylene copolymer (RAHECO). Accordingly, it is in particular appreciated that the instant heterophasic propylene copolymer (RAHECO) contains only the propylene-$C_4$ to $C_{12}$ α-olefin copolymer (C-PP), the elastomeric propylene copolymer (EC) and optionally polyethylene in amounts as mentioned in this paragraph.

The heterophasic propylene copolymer (RAHECO) according to this invention is featured by a moderate melt flow rate. Accordingly, the heterophasic propylene copolymer (RAHECO) has a melt flow rate $MFR_2$ (230° C.) in the range of 2.5 to 200.0 g/10 min, preferably in the range of 5.0 to 100.0 g/10 min, more preferably in the range of 8.0 to 80.0 g/10 min, like in the range of 8.0 to 50.0 g/10 min.

Preferably, it is desired that the heterophasic propylene copolymer (RAHECO) is thermo mechanically stable. Accordingly, it is preferred that the heterophasic propylene copolymer (RAHECO) has a dominant melting temperature representing more than 50% of the total melting enthalpy of at least 135° C., more preferably in the range of 137 to 155° C., even more preferably in the range of 139 to 150° C.

Preferably the heterophasic propylene copolymer (RAHECO) has a crystallization temperature Tc of at most 105° C. (if not α-nucleated) and a crystallization temperature Tc of at least 110° C. (if α-nucleated).

As mentioned above multiphase structure of the heterophasic propylene copolymer (RAHECO) (elastomeric propylene copolymer (EC) dispersed in the matrix (M)) can be identified by the presence of at least two distinct glass transition temperatures. The higher first glass transition temperature (Tg(1)) represents the matrix (M), i.e. the propylene-$C_4$ to $C_{12}$ α-olefin copolymer (C-PP), whereas the lower second glass transition temperature (Tg(2)) reflects the elastomeric propylene copolymer (E) of the heterophasic propylene copolymer (RAHECO).

Accordingly the heterophasic propylene copolymer (RAHECO) according to this invention has a first glass transition temperature Tg(1) and a second glass transition temperature Tg(2), wherein said first glass transition temperature Tg(1) is above the second glass transition temperature Tg(2), preferably the difference between the first glass transition temperature Tg(1) and second glass transition temperature Tg(2) is at least 20° C. Still more preferably the difference between the first glass transition temperature Tg(1) and second glass transition temperature Tg(2) is at least 24° C., yet more preferably in the range of 20 to 45° C., still more preferably in the range of 24 to 40° C. Preferably the first glass transition temperature Tg(1) is in the range of −5 to +12° C. and/or the second glass transition temperature Tg(2) is in the range of −45 to −25° C.

Preferably the second glass transition temperature Tg(2) is equal or below −25° C., more preferably is in the range of −45 to equal or below −25° C., still more preferably in the range of −40 to −28° C.

It is further appreciated that the heterophasic propylene copolymer (RAHECO) according to this invention has additionally a first glass transition temperature Tg(1) (representing the matrix (M) of the heterophasic propylene copolymer (RAHECO)) in the range of −5 to +12° C., more preferably in the range of 0 to +10° C., like in the range +2 to +8° C.

The heterophasic propylene copolymer (RAHECO) according to this invention is preferably α-nucleated, i.e.comprises an α-nucleating agent. Even more preferred the present heterophasic propylene copolymer (RAHECO) is free of β-nucleating agents. The α-nucleating agent, if present, is preferably selected from the group consisting of
(i) salts of monocarboxylic acids and polycarboxylic acids, e.g. sodium benzoate or aluminum tert-butylbenzoate, and
(ii))) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyl-dibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (ii)i) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", 6th edition, 2009 of Hans Zweifel (pages 967 to 990).

The α-nucleating agent content of the heterophasic propylene copolymer (RAHECO) is preferably up to 5.0 wt.-%. In a preferred embodiment, the heterophasic propylene copolymer (RAHECO) contains not more than 3000 ppm, more preferably of 1 to 2000 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

In a preferred embodiment the heterophasic propylene copolymer (RAHECO) contains a vinylcycloalkane, like vinylcyclohexane (VCH), polymer and/or vinylalkane polymer, as the preferable α-nucleating agent. Preferably in this embodiment the propylene copolymer contains a vinylcycloalkane, like vinylcyclohexane (VCH), polymer and/or vinylalkane polymer, preferably vinylcyclohexane (VCH). More preferably the amount of vinylcycloalkane, like vinylcyclohexane (VCH), polymer and/or vinylalkane polymer, more preferably of vinylcyclohexane (VCH) polymer, in the heterophasic propylene copolymer (RAHECO) is not more than 500 ppm, more preferably of 1 to 200 ppm, most preferably 5 to 100 ppm.

The α-nucleating agent can be introduced as a masterbatch. Alternatively some α-nucleating agents as defined in the present invention, can be also introduced by BNT-technology.

The α-nucleating agent may be introduced to the heterophasic propylene copolymer (RAHECO) e.g. during the polymerization process of the heterophasic propylene copolymer (RAHECO) or may be incorporated to the heterophasic propylene copolymer (RAHECO) in the form of masterbatch (MB) together with e.g. a carrier polymer.

In case of the embodiment of a masterbatch (MB) incorporation the masterbatch (MB) contains an α-nucleating agent, which is preferably a polymeric α-nucleating agent, most preferably a vinylcycloalkane, like vinylcyclohexane (VCH), polymer and/or vinylalkane polymer, preferably vinylcyclohexane (VCH) polymer, as defined above or below, in an amount of not more than 500 ppm, more preferably of 1 to 200 ppm, and still more preferably of 5 to 100 ppm, based on the weight of the masterbatch (MB) (100 wt. %). In this embodiment, more preferably, said masterbatch (MB) is present in an amount of not more than 10.0 wt.-%, more preferably not more than 5.0 wt.-% and most preferably not more than 3.5 wt.-%, with the preferred amount of masterbatch (MB) being from 1.5 to 3.5 wt.-%, based on the total amount of the heterophasic propylene copolymer (RAHECO). Most preferably the masterbatch (MB) comprises, preferably consists of the homopolymer or copolymer, preferably homo polymer, of propylene which has been nucleated according to BNT-technology as known in the art. With regard to the BNT-technology reference is made to the international applications WO 99/24478, WO 99/24479 and particularly WO 00/68315.

In another preferred aspect the heterophasic propylene copolymer (RAHECO) of this invention has a) a tensile modulus measured according ISO 527-1 at 23° C. of at least 500 MPa, more preferably in the range of 500 to 900 MPa, yet more preferably in the range of 520 to 800 MPa;

and/or b) hexane soluble content determined according to FDA method on cast films of 100 μm of below 3.0 wt.-%, more preferably in the range of above 0.8 to below 3.0 wt.-%, still more preferably in the range of 1.0 to 2.8 wt.-%.

The heterophasic propylene copolymer (RAHECO) comprises apart from propylene also other comonomers. Accordingly it is preferred that the total comonomer content of the heterophasic propylene copolymer (RAHECO) is in the range of 12.0 to 35.0 wt.-%, more preferably in the range of 15.0 to 30.0 wt.-%, still more preferably in the range of 18.0 to 28.0 wt.-%, like in the range of 19.0 to 25.0 wt.-%.

As mentioned above and explained in more detail below the heterophasic propylene copolymer (RAHECO) comprises a matrix (M) being a propylene-$C_4$ to $C_{12}$ α-olefin copolymer (C-PP) and an elastomeric propylene copolymer (EC) comprising units derivable from propylene and at least ethylene. Accordingly the heterophasic propylene copolymer (RAHECO) according to this invention is understood as a polypropylene comprising, preferably consisting of, units derivable from (a) propylene, (b) ethylene, and (c) $C_4$ to $C_{12}$ α-olefin, preferably $C_4$ to $C_8$ α-olefin, more preferably at least one, like one, α-olefin selected from the group consisting of 1-butene, 1-pentene, 1-hexene, 1-heptene and 1-octene, still more preferably at least one, like one, α-olefin selected from the group consisting of 1-butene, 1-hexene, and 1-octene, yet more preferably 1-butene and/or 1-hexene, like 1-hexene.

Thus when specifying the total comonomer content of the heterophasic propylene copolymer (RAHECO), the total amount of units (based on the total weight of the heterophasic propylene copolymer (RAHECO)) derivable from ethylene and $C_4$ to $C_{12}$ α-olefin, more preferably derivable from ethylene and 1-butene and/or 1-hexene, like derivable from ethylene and 1-hexene, is meant.

Preferably the heterophasic propylene copolymer (RAHECO) according to the invention preferably fulfills in-equation (I), more preferably in-equation (Ia), still more preferably in-equation (Ib), yet more preferably in-equation (Ic);

$$\frac{C2(\text{total})}{Cx(\text{total})} > 1.0; \qquad (I)$$

$$15.0 \geq \frac{C2(\text{total})}{Cx(\text{total})} > 2.5; \qquad (Ia)$$

$$12.0 \geq \frac{C2(\text{total})}{Cx(\text{total})} \geq 5.0; \qquad (Ib)$$

$$11.0 \geq \frac{C2(\text{total})}{Cx(\text{total})} \geq 7.5; \qquad (Ic)$$

wherein

C2(total) is the ethylene content [in wt.-%] of the heterophasic propylene copolymer (RAHECO);

Cx(total) is the $C_4$ to $C_{12}$ α-olefin content, preferably 1-butene and/or 1-hexene content, [in wt.-%] of the heterophasic propylene copolymer (RAHECO).

Accordingly it is preferred that the ethylene content of the heterophasic propylene copolymer (RAHECO) is in the range of 12.0 to 33.0 wt.-%, more preferably in the range of 15.0 to 30.0 wt.-%, still more preferably in the range of 16.0 to 25.0 wt.-%.

Additionally or alternatively to the ethylene content, it is preferred that the $C_4$ to $C_{12}$ α-olefin content, preferably 1-butene and/or 1-hexene content, like the 1-hexene content, of the heterophasic propylene copolymer (RAHECO) is in the range of 0.5 to 6.0 wt.-%, more preferably in the range of 1.0 to 5.0 wt.-%, still more preferably in the range of 1.2 to 4.5 wt.-%, yet more preferably in the range of 1.5 to 4.0 wt.-%.

The xylene cold soluble (XCS) fraction measured according to ISO 16152 (25° C.) of the heterophasic propylene copolymer (RAHECO) is in the range from 10.0 to equal or below 40.0 wt.-%, preferably in the range from 12.0 to 30.0 wt.-%, more preferably in the range from 12.0 to 25.0 wt.-%, still more preferably in the range from 12.0 to 23.0 wt.-%.

The remaining part is the xylene cold in-soluble (XCI) fraction of the heterophasic propylene copolymer (RAHECO). Accordingly the xylene cold in-soluble (XCI) fraction of the heterophasic propylene copolymer (RAHECO) is in the range from equal or below 60.0 to 90.0 wt.-%, preferably in the range from 70.0 to 88.0 wt.-%, more preferably in the range from 75.0 to 88.0 wt.-%, still more preferably in the range from 77.0 to 88.0 wt.-%.

The total comonomer content, i.e. ethylene and $C_4$ to $C_{12}$ α-olefin content together, of the xylene cold in-soluble (XCI) fraction of the heterophasic propylene copolymer (RAHECO) is in the range from 3.0 to 12.0 wt.-%, more preferably in the range from 4.0 to 10.0 wt.-%, yet more preferably in the range from 5.0 to 9.5 wt.-%, still more preferably in the range from 5.5 to 9.0 wt.-%.

The comonomers present in the xylene cold in-soluble (XCI) fraction are those defined above, i.e.
(i) ethylene
and
(ii)) $C_4$ to $C_{12}$ α-olefin, preferably $C_4$ to $C_8$ α-olefin, more preferably at least one, like one, α-olefin selected from the group consisting of 1-butene, 1-pentene, 1-hexene, 1-heptene and 1-octene, still more preferably at least one, like one, α-olefin selected from the group consisting of 1-butene, 1-hexene, and 1-octene, yet more preferably 1-butene and/or 1-hexene, like 1-hexene.

Preferably the ethylene content of the xylene cold in-soluble (XCI) fraction of the heterophasic propylene copolymer (RAHECO) is in the range from 2.0 to 11.0 wt.-%, more preferably in the range from 3.0 to 9.0 wt.-%, yet more preferably in the range from 3.5 to 8.0 wt.-%, still more preferably in the range from 4.0 to 7.0 wt.-%, like in the range of 4.5 to 6.5 wt.-%.

Preferably the $C_4$ to $C_{12}$ α-olefin content, e.g. the 1-butene content and/or 1-hexene content, of the xylene cold in-soluble (XCI) fraction of the heterophasic propylene copolymer (RAHECO) is in the range from 0.5 to 6.0 wt.-%, more preferably in the range from 1.0 to 5.5 wt.-%, yet more preferably in the range from 1.5 to 5.0 wt.-%, still more preferably in the range from 1.8 to 4.5 wt.-%, like in the range of 2.0 to 4.0 wt.-%.

Accordingly it is especially preferred that the heterophasic propylene copolymer (RAHECO) fulfills the in-equation (II), more preferably in-equation (IIa), still more preferably in-equation (IIb), yet more preferably in-equation (IIc);

$$\frac{C2(XCI)}{Cx(XCI)} > 1.0 \tag{II}$$

$$3.0 > \frac{C2(XCI)}{Cx(XCI)} > 1.0 \tag{IIa}$$

$$2.5 > \frac{C2(XCI)}{Cx(XCI)} > 1.2 \tag{IIb}$$

$$2.0 > \frac{C2(XCI)}{Cx(XCI)} > 1.4 \tag{IIc}$$

wherein
C2(XCI) is the ethylene content [in wt.-%] of the xylene cold in-soluble (XCI) fraction of the heterophasic propylene copolymer (RAHECO);
Cx(XCI) is the $C_4$ to $C_{12}$ α-olefin content [in wt.-%], preferably the 1-hexene content [in wt.-%], of the xylene cold in-soluble (XCI) fraction of the heterophasic propylene copolymer (RAHECO).

With regard to the xylene cold soluble (XCS) fraction of the heterophasic propylene copolymer (RAHECO) the following is especially preferred.

Preferably the xylene cold soluble fraction (XCS) of the heterophasic propylene copolymer (RAHECO) has an intrinsic viscosity (IV) measured according to ISO 1628/1 (at 135° C. in decalin) of at least 1.2 dl/g, more preferably in the range of 1.2 to 2.5 dl/g, more preferably in the range of 1.4 to 2.2 dl/g, still more preferably in the range of 1.5 to 2.0 dl/g.

Additionally it is preferred that the total comonomer content and/or ethylene content of the xylene cold soluble (XCS) fraction of the heterophasic propylene copolymer (RAHECO) is in the range of 30.0 to 90.0 wt.-%, still more preferably in the range of 50.0 to 90.0 wt.-%, yet more preferably in the range of 60.0 to 90.0 wt.-%, like in the range of 70.0 to 85.0 wt.-%. The comonomers present in the xylene cold soluble (XCS) fraction are those defined above, i.e.
(i) ethylene
and optionally
(ii)) $C_4$ to $C_{12}$ α-olefin, preferably $C_4$ to $C_8$ α-olefin, more preferably at least one, like one, α-olefin selected from the group consisting of 1-butene, 1-pentene, 1-hexene, 1-heptene and 1-octene, still more preferably at least one, like one, α-olefin selected from the group consisting of 1-butene, 1-hexene, and 1-octene, yet more preferably 1-butene and/or 1-hexene, like 1-hexene.

Additionally it is preferred that the heterophasic propylene copolymer (RAHECO) according to the invention fulfills in-equation (III), more preferably in-equation (IIIa), still more preferably in-equation (IIIb), $$\frac{C(XCS)}{C(\text{total})} \geq 1.5; \tag{III}$$

$$6.0 \geq \frac{C(XCS)}{C(\text{total})} \geq 2.0; \tag{IIIa}$$

$$5.0 \geq \frac{C(XCS)}{C(\text{total})} \geq 2.5; \tag{IIIb}$$

wherein
C(XCS) is the total comonomer content [in wt.-%] of the xylene cold soluble (XCS) fraction of the heterophasic propylene copolymer (RAHECO);

C(total) is the total comonomer content [in wt.-%] of the heterophasic propylene copolymer (RAHECO).

Additionally or alternatively to the in-equation (III) it is preferred that the heterophasic propylene copolymer (RAHECO) fulfills in-equation (IV), more preferably in-equation (IVa), still more preferably in-equation (IVb), yet more preferably in-equation (IVc), $$\frac{C2(XCS)}{C2(\text{total})} \geq 1.7 \quad \text{(IV)}$$

$$8.0 \geq \frac{C2(XCS)}{C2(\text{total})} \geq 2.0 \quad \text{(IVa)}$$

$$7.0 \geq \frac{C2(XCS)}{C2(\text{total})} \geq 3.0 \quad \text{(IVb)}$$

$$6.0 \geq \frac{C2(XCS)}{C2(\text{total})} \geq 3.5 \quad \text{(IVc)}$$

wherein
C2(XCS) is the ethylene content [in wt.-%] of the xylene cold soluble (XCS) fraction of the heterophasic propylene copolymer (RAHECO);
C2(total) is the ethylene content [in wt.-%] of the heterophasic propylene copolymer (RAHECO).

Additionally it is preferred that the heterophasic propylene copolymer (RAHECO) fulfills in-equation (V), more preferably in-equation (Va), still more preferably in-equation (Vb), $$\frac{C2(XCS)}{C(XCI)} \geq 4.5 \quad \text{(V)}$$

$$18.0 \geq \frac{C2(XCS)}{C(XCI)} \geq 5.0 \quad \text{(Va)}$$

$$15.0 \geq \frac{C2(XCS)}{C(XCI)} \geq 6.0 \quad \text{(Vb)}$$

wherein
C2(XCS) is the ethylene content [in wt.-%] of the xylene cold soluble (XCS) fraction of the heterophasic propylene copolymer (RAHECO);
C(XCI) is the total comonomer content [in wt.-%], i.e. the ethylene content and $C_4$ to $C_{12}$ α-olefin content together, of the xylene cold in-soluble (XCI) fraction of the heterophasic propylene copolymer (RAHECO).

In one specific preferred embodiment the heterophasic propylene copolymer (RAHECO) fulfills in-equation (VI), more preferably in-equation (VIa), still more preferably in-equation (VIb), yet more preferably in-equation (VIc), $$\frac{C2(XCS)}{C2(XCI)} \geq 5.0 \quad \text{(VI)}$$

$$25.0 \geq \frac{C2(XCS)}{C2(XCI)} \geq 8.0 \quad \text{(VIa)}$$

$$22.0 \geq \frac{C2(XCS)}{C2(XCI)} \geq 10.0 \quad \text{(VIb)}$$

$$20.0 \geq \frac{C2(XCS)}{C2(XCI)} \geq 12.0 \quad \text{(VIc)}$$

wherein
C2(XCS) is the ethylene content [in wt.-%] of the xylene cold soluble (XCS) fraction of the heterophasic propylene copolymer (RAHECO);
C2(XCI) is the ethylene content [in wt.-%] of the xylene cold in-soluble (XCI) fraction of the heterophasic propylene copolymer (RAHECO).

Finally it is preferred that the heterophasic propylene copolymer (RAHECO) according to the invention preferably fulfills in-equation (VIII), more preferably in-equation (VIIIa), still more preferably in-equation (VIIIb), $$\frac{C(\text{total})}{XCS} \geq 1.0 \quad \text{(VII)}$$

$$2.0 \geq \frac{C(\text{total})}{XCS} > 1.0 \quad \text{(VIIa)}$$

$$1.8 \geq \frac{C(\text{total})}{XCS} > 1.1 \quad \text{(VIIb)}$$

wherein
C(XCS) is the total comonomer content, i.e. the ethylene content and $C_4$ to $C_{12}$ α-olefin content together, [in wt-%] of the heterophasic propylene copolymer (RAHECO);
XCS is the content [in wt.-%] of the xylene cold soluble (XCS) fraction of the heterophasic propylene copolymer (RAHECO).

In addition to α-nucleating agent, the heterophasic propylene copolymer (RAHECO) as defined in the instant invention may contain, preferably contains, up to 5.0 wt.-% additives, like antioxidants, acid scavengers, UV stabilisers, as well as processing aids, such as slip agents and antiblocking agents. Preferably the additive content (without α-nucleating agents) is below 3.0 wt.-%, like below 1.0 wt.-%.

As mentioned above the heterophasic propylene copolymer (RAHECO) comprises as main components the matrix (M) being a propylene-$C_4$ to $C_{12}$ α-olefin copolymer (C-PP) and the elastomeric propylene copolymer (EC) dispersed in said matrix (M). Accordingly the heterophasic propylene copolymer (RAHECO) can be further defined by these individual components, i.e. by the propylene-$C_4$ to $C_{12}$ α-olefin copolymer (C-PP) and the elastomeric propylene copolymer (EC).

Accordingly the propylene-$C_4$ to $C_{12}$ α-olefin copolymer (C-PP) according to this invention comprises units derivable from (i) propylene and (ii) at least one, preferably one, $C_4$ to $C_{12}$ α-olefin, like 1-hexene. Thus, the propylene-$C_4$ to $C_{12}$ α-olefin copolymer (C-PP) comprises, consists of, monomers copolymerizable with propylene, i.e. $C_4$ to $C_{12}$ α-olefins, in particular $C_4$ to $C_8$ α-olefins, like $C_4$ to $C_6$ α-olefins, e.g. 1-butene and/or 1-hexene. Preferably the propylene-$C_4$ to $C_{12}$ α-olefin copolymer (C-PP) according to this invention comprises, especially consists of, monomers copolymerizable with propylene from the group consisting of 1-butene, 1-hexene, 1-octene. More specifically the propylene-$C_4$ to $C_{12}$ α-olefin copolymer (C-PP) of this invention comprises—apart from propylene—units derivable from 1-butene and/or 1-hexene, preferably from 1-hexene. In a preferred embodiment the propylene-$C_4$ to $C_{12}$ α-olefin copolymer (C-PP) comprises units derivable from propylene and 1-hexene only, i.e. is a propylene-1-hexene copolymer ($C_6$-PP).

The comonomer content, preferably the $C_4$ to $C_{12}$ α-olefin content, more preferably the 1-butene and/or 1-hexene content, like the 1-hexene content, of the propylene-$C_4$ to $C_{12}$ α-olefin copolymer (C-PP) is in the range of 1.5 to 9.0 wt.-%, yet more preferably in the range of 2.0 to 6.0 wt.-%, still more preferably in the range of 2.5 to 5.0 wt.-%.

Preferably the propylene-$C_4$ to $C_{12}$ α-olefin copolymer (C-PP) has a melt flow rate $MFR_2$ (230° C.) in the range of 5.0 to 100.0 g/10 min, preferably in the range of 10.0 to 80.0 g/10 min, more preferably in the range of 20.0 to 60.0 g/10 min.

The xylene cold soluble (XCS) fraction measured according to according ISO 16152 (25° C.) of the propylene-$C_4$ to $C_{12}$ α-olefin copolymer (C-PP) preferably is below 10.0 wt.-%, more preferably in the range from 0.2 to equal or below 7.0 wt.-%, still more preferably in the range from 0.8 to 5.0 wt.-%, more preferably in the range from 0.8 to 2.5 wt.-%.

The propylene copolymer (R-PP) preferably comprises at least two polymer fractions, like two or three polymer fractions; at least one of them is a propylene-$C_4$ to $C_{12}$ α-olefin copolymer. Even more preferred the propylene-$C_4$ to $C_{12}$ α-olefin copolymer (C-PP) comprises, preferably consists of, a first polypropylene fraction (PP1) and a second propylene-$C_4$ to $C_{12}$ α-olefin copolymer fraction (C-PP2). It is especially preferred that the propylene-$C_4$ to $C_{12}$ α-olefin copolymer (C-PP) comprises, preferably consists of, a first polypropylene fraction (PP1) and a second propylene-$C_4$ to $C_{12}$ α-olefin copolymer fraction (C-PP2), wherein the comonomer content in the first polypropylene fraction (PP1) is at most 4.0 wt.-%.

The weight ratio between the first polypropylene fraction (PP1), e.g. the first propylene-$C_4$ to $C_{12}$ α-olefin copolymer fraction (C-PP1), and the second propylene-$C_4$ to $C_{12}$ α-olefin copolymer fraction (C-PP2) [(PP1)/(C-PP2)] is in the range of 30/70 to 70/30, more preferably in the range of 35/65 to 65/35, like in the range of 40/60 to 55/45.

It is preferred that the first polypropylene fraction (PP1), e.g. the first propylene-$C_4$ to $C_{12}$ α-olefin copolymer fraction (C-PP1), is the comonomer lean fraction, e.g the $C_4$ to $C_{12}$ α-olefin lean fraction, whereas the second propylene-$C_4$ to $C_{12}$ α-olefin copolymer fraction (C-PP2) is the comonomer rich fraction, e.g. the $C_4$ to $C_{12}$ α-olefin rich fraction. Accordingly in one preferred embodiment the comonomer content, like the $C_4$ to $C_{12}$ α-olefin content, [in wt.-%] in the propylene-$C_4$ to $C_{12}$ α-olefin copolymer (C-PP) is higher than in the first propylene-$C_4$ to $C_{12}$ α-olefin copolymer fraction (C-PP1).

Thus it is preferred that the first polypropylene fraction (PP1), e.g. the first propylene-$C_4$ to $C_{12}$ α-olefin copolymer fraction (C-PP1), has rather low comonomer content, e.g. rather low $C_4$ to $C_{12}$ α-olefin content.

Accordingly it is preferred that the first polypropylene fraction (PP1) of the heterophasic propylene copolymer (RAHECO) is
(a) a propylene homopolymer fraction (H-PP1);
or
(b) a first propylene-$C_4$ to $C_{12}$ α-olefin copolymer fraction (C-PP1), preferably said first propylene-$C_4$ to $C_{12}$ α-olefin copolymer fraction (C-PP1) has a $C_4$ to $C_{12}$ α-olefin content in the range of 0.5 to 4.0 wt.-%.

It is especially preferred that the first polypropylene fraction (PP1) is a first propylene-$C_4$ to $C_{12}$ α-olefin copolymer fraction (C-PP1) as defined herein.

The expression propylene homopolymer, e.g. the first propylene homopolymer (fraction) (H-PP1), used in the instant invention relates to a polypropylene that consists substantially, i.e. of more than 99.0 mol-%, such as at least 99.5 mol-%, still more preferably of at least 99.7 mol-%, of propylene units. In a preferred embodiment only propylene units in the propylene homopolymer, e.g. the first propylene homopolymer (fraction) (H-PP1), are detectable.

In case the first polypropylene fraction (PP1) is a first propylene-$C_4$ to $C_{12}$ α-olefin copolymer fraction (C-PP1) it comprises units derivable from (i) propylene and (ii) at least one, preferably one, $C_4$ to $C_{12}$ α-olefin, like 1-hexene. Thus, the first propylene-$C_4$ to $C_{12}$ α-olefin copolymer fraction (C-PP1) comprises, consists of, monomers copolymerizable with propylene, i.e. $C_4$ to $C_{12}$ α-olefins, in particular $C_4$ to $C_8$ α-olefins, like $C_4$ to $C_6$ α-olefins, e.g. 1-butene and/or 1-hexene. Preferably the first propylene-$C_4$ to $C_{12}$ α-olefin copolymer fraction (C-PP1) according to this invention comprises, especially consists of, monomers copolymerizable with propylene from the group consisting of 1-butene, 1-hexene, 1-octene. More specifically the first propylene-$C_4$ to $C_{12}$ α-olefin copolymer fraction (C-PP1) of this invention comprises—apart from propylene—units derivable from 1-butene and/or 1-hexene, preferably from 1-hexene. In a preferred embodiment the first propylene-$C_4$ to $C_{12}$ α-olefin copolymer fraction (C-PP1) comprises units derivable from propylene and 1-hexene only, i.e. is a first propylene-1-hexene copolymer fraction ($C_6$-PP1).

The comonomer content, preferably the $C_4$ to $C_{12}$ α-olefin content, more preferably the 1-butene and/or 1-hexene content, like the 1-hexene content, of the first propylene-$C_4$ to $C_{12}$ α-olefin copolymer fraction (C-PP1) is in the range of 0.5 to 4.0 wt.-%, yet more preferably in the range of 0.5 to 3.5 wt.-%, still more preferably in the range of 0.7 to 3.0 wt.-%.

Further it is preferred that the amount of the xylene cold soluble (XCS) fraction of the first polypropylene fraction (PP1), e.g. of the first propylene-$C_4$ to $C_{12}$ α-olefin copolymer fraction (C-PP1), is equal or below than 4.0 wt.-%, more preferably is in the range of 0.5 to 3.5 wt.-%, still more preferably is in the range of 0.8 to 2.5 wt.-%.

Preferably the first polypropylene fraction (PP1), e.g. the first propylene-$C_4$ to $C_{12}$ α-olefin copolymer fraction (C-PP1), has a melt flow rate $MFR_2$ (230° C.) in the range of 5.0 to 100.0 g/10 min, preferably in the range of 10.0 to 80.0 g/10 min, more preferably in the range of 20.0 to 60.0 g/10 min.

The second fraction of the propylene-$C_4$ to $C_{12}$ α-olefin copolymer (C-PP) is a copolymer fraction, i.e. the second propylene-$C_4$ to $C_{12}$ α-olefin copolymer fraction (C-PP2), having a higher comonomer content, preferably higher $C_4$ to $C_{12}$ α-olefin content, more preferably higher 1-butene and/or 1-hexene content, like higher 1-hexene content, than the first polypropylene fraction (PP1).

It is especially preferred that the difference in comonomer content, preferably the $C_4$ to $C_{12}$ α-olefin content, more preferably the 1-butene and/or 1-hexene content, like the 1-hexene content, between the propylene-$C_4$ to $C_{12}$ α-olefin copolymer (C-PP) and the first polypropylene fraction (PP1), e.g. the first propylene-$C_4$ to $C_{12}$ α-olefin copolymer fraction (C-PP1), [(C-PP)–(PP1)] differs by at least 1.5 wt-%; more preferably by 1.5 to 6.0 wt.-%, yet more preferably by 1.5 to 4.0 wt.-%, still more preferably by 1.8 to 3.5 wt.-%.

Thus it is preferred that the second propylene-$C_4$ to $C_{12}$ α-olefin copolymer fraction (C-PP2) has a comonomer content, preferably $C_4$ to $C_{12}$ α-olefin content, more preferably 1-butene and/or 1-hexene content, like 1-hexene content, of equal or above 2.0 wt.-%, more preferably in the range of 2.0 to 15.0 wt.-%, like 2.0 to 10.0 wt.-%, yet more preferably in the range of 3.0 to 8.0 wt.-%.

Accordingly it is further preferred that the comonomer content. preferably the $C_4$ to $C_{12}$ α-olefin content, more preferably the 1-butene and/or 1-hexene content, like the 1-hexene content, between the second propylene-$C_4$ to $C_{12}$ α-olefin copolymer fraction (C-PP2) and the first polypropylene fraction (PP1), e.g. the first propylene-$C_4$ to $C_{12}$ α-olefin copolymer fraction (C-PP1), [(R-PP2)–(PP1)] differs by at least 2.5 wt.-%, more preferably by 2.5 to 10.0 wt.-%, like by 3.0 to 10.0 wt.-%, yet more preferably by 3.0 to 8.0 wt.-%, still more preferably by 3.0 to 6.0 wt.-%.

The second propylene-$C_4$ to $C_{12}$ α-olefin copolymer fraction (C-PP2) comprises units derivable from (i) propylene and (ii) at least one, preferably one, $C_4$ to $C_{12}$ α-olefin, like 1-hexene. Thus, the second propylene-$C_4$ to $C_{12}$ α-olefin copolymer fraction (C-PP2) comprises, consists of, monomers copolymerizable with propylene, i.e. $C_4$ to $C_{12}$ α-olefins, in particular $C_4$ to $C_8$ α-olefins, like $C_4$ to $C_6$ α-olefins, e.g. 1-butene and/or 1-hexene. Preferably the second propylene-$C_4$ to $C_{12}$ α-olefin copolymer fraction (C-PP2) according to this invention comprises, especially consists of, monomers copolymerizable with propylene from the group consisting of 1-butene, 1-hexene, 1-octene. More specifically the second propylene-$C_4$ to $C_{12}$ α-olefin copolymer fraction (C-PP2) of this invention comprises—apart from propylene—units derivable from 1-butene and/or 1-hexene, preferably from 1-hexene. In a preferred embodiment the second propylene-$C_4$ to $C_{12}$ α-olefin copolymer fraction (C-PP2) comprises units derivable from propylene and 1-hexene only, i.e. is a second propylene-1-hexene copolymer fraction ($C_6$-PP2).

In one particular preferred embodiment the propylene-$C_4$ to $C_{12}$ α-olefin copolymer (C-PP) comprises, preferably consists of, the first propylene-$C_4$ to $C_{12}$ α-olefin copolymer fraction (C-PP1) and the second propylene-$C_4$ to $C_{12}$ α-olefin copolymer fraction (C-PP2), wherein both fractions comprises, consists of, units derivable from propylene and at least one $C_4$ to $C_{12}$ α-olefin, more preferably from propylene and one $C_4$ to $C_{12}$ α-olefin, yet more preferably from propylene and 1-hexene or from propylene and 1-butene. In one specific preferred embodiment the propylene-$C_4$ to $C_{12}$ α-olefin copolymer (C-PP) comprises, preferably consists of, the first propylene-$C_4$ to $C_{12}$ α-olefin copolymer fraction (C-PP1) and the second propylene-$C_4$ to $C_{12}$ α-olefin copolymer fraction (C-PP2), wherein both fractions comprises, consists of, propylene and 1-hexene only.

Preferably the weight ratio between the matrix (M), i.e. the propylene-$C_4$ to $C_{12}$ α-olefin copolymer (C-PP), and the elastomeric propylene copolymer (EC) is in the range of 15/1 to 2/1, more preferably in the range of 10/1 to 5/2, still more preferably in the range of 8/1 to 3/1.

Accordingly in one preferred embodiment, the heterophasic propylene copolymer (RAHECO) preferably comprises 65 to 95 wt.-%, more preferably 70 to 90 wt.-%, of the matrix (M), i.e. of the propylene-$C_4$ to $C_{12}$ α-olefin copolymer (C-PP), based on the total weight of the heterophasic propylene copolymer (RAHECO).

Additionally, the heterophasic propylene copolymer (RAHECO) preferably comprises 5 to 35 wt.-%, more preferably 10 to 30 wt.-%, of the elastomeric propylene copolymer (EC), based on the total weight of the heterophasic propylene copolymer (RAHECO).

Thus, it is appreciated that the heterophasic propylene copolymer (RAHECO) preferably comprises, more preferably consists of, 65 to 95 wt.-%, more preferably 70 to 90 wt, of the matrix (M), i.e. of the propylene-$C_4$ to $C_{12}$ α-olefin copolymer (C-PP), and 5 to 35 wt.-%, more preferably 10 to 30 wt.-%, of the elastomeric propylene copolymer (EC), based on the total weight of the heterophasic propylene copolymer (RAHECO).

Accordingly, a further component of the heterophasic propylene copolymer (RAHECO) is the elastomeric propylene copolymer (EC) dispersed in the matrix (M). The elastomeric propylene copolymer (EC) comprises units derivable from
(i) propylene and
(ii)) ethylene and optionally at least one $C_4$ to $C_{12}$ α-olefin.

Accordingly the elastomeric propylene copolymer (EC) comprises monomers copolymerizable with propylene, i.e. ethylene and optionally at least one $C_4$ to $C_{12}$ α-olefins, like one $C_4$ to $C_{12}$ α-olefin, in particular ethylene and optionally one $C_4$ to $C_6$ α-olefin, e.g. 1-butene and/or 1-hexene. Preferably, the elastomeric propylene copolymer (EC) comprises, especially consists of, propylene, ethylene, and optionally 1-butene and 1-hexene. More specifically, the elastomeric propylene copolymer (EC) comprises—apart from propylene—units derivable from ethylene and optionally 1-hexene. Thus, in one embodiment the elastomeric propylene copolymer (EC) comprises units derivable from ethylene and propylene only, i.e. is an ethylene-propylene rubber (EPR).

The comonomer content, preferably the ethylene and $C_4$ to $C_{12}$ α-olefin content together, more preferably the ethylene content, of the elastomeric propylene copolymer (EC) preferably is in the range of 40.0 to 95.0 wt.-%, still more preferably in the range of 40.0 to 90.0 wt.-%, yet more preferably in the range of 50.0 to 90.0 wt.-%, like in the range of 70.0 to 90.0 wt.-%.

The present invention is not only directed to the instant heterophasic propylene copolymer (RAHECO) but also to articles, preferably to an article selected from the group consisting of (medical) pouche, food packaging article, film, like unoriented film, and bottle. Accordingly in a further embodiment the present invention is directed to an article, especially to an article selected from the group consisting of (medical) pouche, food packaging article, film, like unoriented film (i.e. cast film or blown film, e.g. air cooled blown film), and bottle, comprising at least 70.0 wt.-%, preferably comprising at least 80.0 wt.-%, more preferably comprising at least 90.0 wt.-%, still more preferably comprising at least 95.0 wt.-%, yet more preferably comprising at least 99.0 wt.-%, of the instant heterophasic propylene copolymer (RAHECO).

One distinguishes between unoriented and oriented films (see for instance polypropylene handbook, Nello Pasquini, $2^{nd}$ edition, Hanser). Oriented films are typically monoaxially or biaxially oriented films, whereas unoriented films are cast or blown films. Accordingly an unoriented film is not drawn intensively in machine and/or transverse direction as done by oriented films. Thus the unoriented film according to this invention is not a monoaxially or biaxially oriented film. Preferably the unoriented film according to the instant invention is a blown film or cast film.

In one specific embodiment the unoriented film is a cast film or an air-cooled blown film.

Preferably the unoriented film has a thickness of 10 to 1000 μm, more preferably of 20 to 700 μm, like of 40 to 500 μm.

The present invention is also directed to the use of the heterophasic propylene copolymer (RAHECO) in the manufacture of an article selected from the group consisting of (medical) pouches, food packaging systems, films, like unoriented films (i.e. cast films or blown films, like air cooled blown films or water quenched blown films), and bottles.

The instant heterophasic propylene copolymer (RAHECO) is preferably produced in a multistage process comprising at least two reactors, preferably at least three reactors, connected in series.

Accordingly the heterophasic propylene copolymer (RA-HECO) according to this invention is produced by polymerizing:

(I) propylene and at least one $C_4$ to $C_{12}$ α-olefin, preferably one $C_4$ to $C_{12}$ α-olefin, more preferably 1-butene and/or 1-hexene, like 1-hexene, so as to form the matrix (M) being the propylene-$C_4$ to $C_{12}$ α-olefin copolymer (C-PP); and subsequently polymerizing (II) propylene and ethylene and optionally at least one $C_4$ to $C_{12}$ α-olefin, preferably propylene and ethylene, in the gas phase, so as to form the elastomeric propylene copolymer (EC) dispersed in said matrix (M);

wherein preferably both steps (I) and (II) take place in the presence of the same single site solid particulate catalyst preferably free from an external carrier, more preferably a catalyst comprising (i) a complex of formula (I) as defined in detail below.

Preferably the heterophasic propylene copolymer (RA-HECO) is obtained by a sequential polymerization process comprising the steps of (a) polymerizing in a first reactor (i) propylene and (ii) optionally at least one $C_4$ to $C_{12}$ α-olefin, preferably one $C_4$ to $C_{12}$ α-olefin, more preferably 1-butene and/or 1-hexene, like 1-hexene, obtaining thereby a first polypropylene fraction (PP1), e.g. a first propylene-$C_4$ to $C_{12}$ α-olefin copolymer fraction (C-PP1), (b) transferring said first polypropylene fraction (PP1), preferably said first propylene-$C_4$ to $C_{12}$ α-olefin copolymer fraction (C-PP1), in a second reactor, (c) polymerizing in said second reactor in the presence of the first polypropylene fraction (PP1), preferably in the presence of the first propylene-$C_4$ to $C_{12}$ α-olefin copolymer fraction (C-PP1), (i) propylene and (ii) at least one $C_4$ to $C_{12}$ α-olefin, preferably one $C_4$ to $C_{12}$ α-olefin, more preferably 1-butene and/or 1-hexene, like 1-hexene, obtaining a second propylene-$C_4$ to $C_{12}$ α-olefin copolymer fraction (C-PP2), said first polypropylene fraction (PP1), preferably said first propylene-$C_4$ to $C_{12}$ α-olefin copolymer fraction (C-PP1), and said second propylene-$C_4$ to $C_{12}$ α-olefin copolymer fraction (C-PP2) form the matrix (M), i.e. the propylene-$C_4$ to $C_{12}$ α-olefin copolymer (C-PP), (d) transferring said matrix (M) in a third reactor, (e) polymerizing in said third reactor in the presence of the matrix (M) propylene and ethylene and optionally at least one $C_4$ to $C_{12}$ α-olefin, preferably propylene and ethylene, obtaining an elastomeric propylene copolymer (EC), said matrix (M) and said elastomeric propylene copolymer (EC) form the heterophasic propylene copolymer (RA-HECO), wherein preferably the steps take place in the presence of the same single site solid particulate catalyst preferably free from an external carrier, more preferably a catalyst comprising (i) a complex of formula (I) as defined in detail below.

For preferred embodiments of the heterophasic propylene copolymer (HECO), the propylene-$C_4$ to $C_{12}$ α-olefin copolymer (C-PP), the first polypropylene fraction (PP1), like the first propylene-$C_4$ to $C_{12}$ α-olefin copolymer fraction (C-PP1), the second propylene-$C_4$ to $C_{12}$ α-olefin copolymer fraction (C-PP2), and the elastomeric copolymer (CE) reference is made to the definitions given above.

The term "sequential polymerization process" indicates that the heterophasic propylene copolymer (HECO) is produced in at least two, like three, reactors connected in series. Accordingly the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor are gas phase reactors (GPR). Accordingly for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (RAHECO) as defined above the conditions for the first reactor, i.e. the slurry reactor, like a loop reactor, may be as follows:

the temperature is within the range of 50° C. to 110° C., preferably between 60° C. and 100° C., more preferably between 65 and 95° C., the pressure is within the range of 20 bar to 80 bar, preferably between 40 bar to 70 bar, hydrogen can be added for controlling the molar mass in a manner known per se.

Subsequently, the reaction mixture of the first reactor is transferred to the second reactor, i.e. gas phase reactor, where the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor is similar to the second reactor.

The residence time can vary in the three reactors.

In one embodiment of the process for producing the heterophasic propylene copolymer (RAHECO) the residence time in bulk reactor, e.g. loop is in the range 0.1 to 2.5 hours, e.g. 0.15 to 1.5 hours and the residence time in gas phase reactor will generally be 0.2 to 6.0 hours, like 0.3 to 4.0 hours.

If desired, the polymerization may be effected in a known manner under supercritical conditions in the first reactor, i.e.

in the slurry reactor, like in the loop reactor, and/or as a condensed mode in the gas phase reactors.

In the following the catalyst component is defined in more detail. Preferably the catalyst comprises (i) a complex of formula (I):

(i) a transition metal compound of formula (I)

$$R_n(Cp')_2MX_2 \quad (I)$$

wherein
"M" is zirconium (Zr) or hafnium (Hf),
each "X" is independently a monovalent anionic σ-ligand,
each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'),
"n" is 1 or 2, preferably 1, and (ii) a cocatalyst comprising a compound of a group 13 metal, e.g. Al or boron compound.

In one specific embodiment the single site solid particulate catalyst has a porosity measured according ASTM 4641 of less than 1.40 ml/g and/or a surface area measured according to ASTM D 3663 of lower than 25 m²/g.

Preferably, the single site solid particulate catalyst has a surface area of lower than 15 m²/g, yet still lower than 10 m²/g and most preferred lower than 5 m²/g, which is the lowest measurement limit. The surface area according to this invention is measured according to ASTM D 3663 ($N_2$).

Alternatively or additionally, it is appreciated that the single site solid particulate catalyst has a porosity of less than 1.30 ml/g and more preferably less than 1.00 ml/g. The porosity has been measured according to ASTM 4641 ($N_2$). In another preferred embodiment the porosity is not detectable when determined with the method applied according to ASTM 4641 ($N_2$).

Furthermore, the single site solid particulate catalyst typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

As stated above, the transition metal (M) is zirconium (Zr) or hafnium (Hf), preferably zirconium (Zr).

The term "σ-ligand" is understood in the whole description in a known manner, i.e. a group bound to the metal via a sigma bond. Thus, the anionic ligands "X" can independently be halogen or be selected from the group consisting of R', OR', SiR'$_3$, OSiR'$_3$, OSO$_2$CF$_3$, OCOR', SR', NR'$_2$ or PR'$_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, —SiR''$_3$, —SR'', —PR''$_2$ or —NR''$_2$, each R'' is independently a hydrogen or hydrocarbyl (e. g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of —NR''$_2$, the two substituents R'' can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. —SiR'''$_2$—, wherein each R''' is independently $C_1$ to $C_{20}$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl-residue, such as trimethylsilyl-, or the two R''' can be part of a ring system including the Si bridging atom.

In a preferred embodiment the transition metal compound has the formula (II)

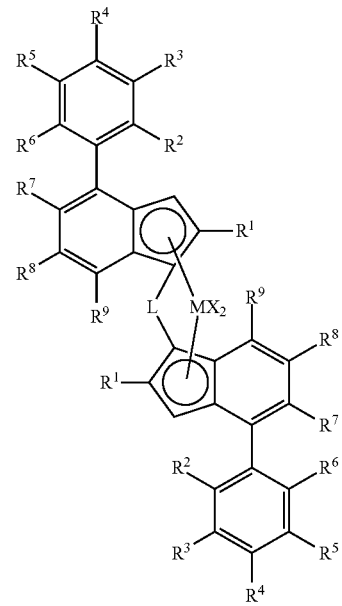

wherein
M is zirconium (Zr) or hafnium (Hf), preferably zirconium (Zr),
X are ligands with a σ-bond to the metal "M", preferably those as defined above for formula (I),
preferably chlorine (Cl) or methyl (CH$_3$), the former especially preferred,
$R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl, $R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC), preferably are equal to or different from each other and are $C_1$ to $C_{10}$ linear or branched hydrocarbyl, more preferably are equal to or different from each other and are $C_1$ to $C_6$ linear or branched alkyl, $R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), $SiR^{10}{}_3$, $GeR^{10}{}_3$, $OR^{10}$, $SR^{10}$ and $NR^{10}{}_2$, wherein $R^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), and/or $R^7$ and $R^8$ being optionally part of a $C_4$ to $C_{20}$ carbon ring system together with the indenyl carbons to which they are attached, preferably a $C_5$ ring, optionally one carbon atom can be substituted by a nitrogen, sulfur or oxygen atom, $R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, $OR^{10}$, and $SR^{10}$ preferably $R^9$ are equal to or different from each other and are H or $CH_3$, wherein $R^{10}$ is defined as before, L is a bivalent group bridging the two indenyl ligands, preferably being a $C_2R^{11}{}_4$ unit or a $SiR^{11}{}_2$ or $GeR^{11}{}_2$, wherein, $R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC), preferably $Si(CH_3)_2$, $SiCH_3C_6H_{11}$, or $SiPh_2$, wherein $C_6H_{11}$ is cyclohexyl.

Preferably, the transition metal compound of formula (II) is $C_2$-symmetric or pseudo-$C_2$-symmetric. Concerning the definition of symmetry it is referred to Resconi et al. Chemical Reviews, 2000, Vol. 100, No. 4 1263 and references herein cited.

Preferably, the residues $R^1$ are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues $R^1$ are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues $R^1$ are equal to or different from each other, more preferably equal, and are selected from the group consisting of linear or branched $C_1$ to $C_4$ hydrocarbyl, such as for example methyl or ethyl.

Preferably, the residues $R^2$ to $R^6$ are equal to or different from each other and linear saturated $C_1$ to $C_4$ alkyl or branched saturated $C_1$ to $C_4$ alkyl. Even more preferably the residues $R^2$ to $R^6$ are equal to or different from each other, more preferably equal, and are selected from the group consisting of methyl, ethyl, iso-propyl and tert-butyl.

Preferably, $R^7$ and $R^8$ are equal to or different from each other and are selected from hydrogen and methyl, or they are part of a 5-methylene ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediyl bis(2-methyl-4-(4-tert-butylphenyl)indenyl)zirconium dichloride.

In a second preferred embodiment, the transition metal compound is rac-dimethylsilanediyl bis(2-methyl-4-phenyl-1,5,6,7-tetrahydro-s-indacen-1-yl)zirconium dichloride.

In a third preferred embodiment, the transition metal compound is rac-dimethylsilanediyl bis(2-methyl-4-phenyl-5-methoxy-6-tert-butylindenyl)zirconium dichloride.

As a further requirement the single site solid particulate catalyst according to this invention must comprise a cocatalyst comprising a compound of a group 13 metal, e.g. Al or boron compound Borate cocatalysts of $B(C_6F_5)_3$, $C_6H_5N(CH_3)_2H$:$B(C_6F_5)_4$, $(C_6H_5)_3C$:$B(C_6F_5)_4$ or $Ni(CN)_4[B(C_6F_5)_3]_4{}^{2-}$ are especially preferred. Suitable cocatalysts are described in WO2013/007650.

Examples of Al cocatalyst are organo aluminium compounds, such as aluminoxane compounds.

Such compounds of Al, preferably aluminoxanes, can be used as the only compound in the cocatalyst or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst are employed. In particular preferred cocatalysts are the aluminoxanes, in particular the C1 to C10-alkylaluminoxanes, most particularly methylaluminoxane (MAO).

Preferably, the organo-zirconium compound or organohafnium compound of formula (I) or (II) and the cocatalyst of the single site solid particulate catalyst represent at least 70 wt %, more preferably at least 80 wt %, even more preferably at least 90 wt %, even further preferably at least 95 wt % of the single site solid particulate catalyst. Thus it is appreciated that the single site solid particulate catalyst is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence of that the single site solid particulate catalyst is self-supported and it has a rather low surface area.

In one embodiment the single site solid particulate catalyst is obtained by the emulsion solidification technology, the basic principles of which are described in WO 03/051934. This document is herewith included in its entirety by reference.

Hence the single site solid particulate catalyst is preferably in the form of solid catalyst particles, obtainable by a process comprising the steps of
a) preparing a solution of one or more catalyst components;
b) dispersing said solution in a second solvent to form an emulsion in which said one or more catalyst components are present in the droplets of the dispersed phase,
c) solidifying said dispersed phase to convert said droplets to solid particles and optionally recovering said particles to obtain said catalyst.

Preferably, a first solvent, more preferably a first organic solvent, is used to form said solution. Still more preferably the organic solvent is selected from the group consisting of a linear alkane, cyclic alkane, aromatic hydrocarbon and halogen-containing hydrocarbon. Moreover, the second solvent forming the continuous phase is an inert solvent towards to catalyst components, The second solvent might be immiscible towards the solution of the catalyst components at least under the conditions (like temperature) during the dirpersing step. The term "immiscible with the catalyst solution" means that the second solvent (continuous phase) is fully immiscible or partly immiscible i.e. not fully miscible with the dispersed phase solution.

Preferably, the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or perfluoro (1,3-dimethylcyclohexane) or a mixture thereof.

Furthermore, it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated C1-n (suitably C4-30-or C5-15) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

In principle, any solidification method can be used for forming the solid particles from the dispersed droplets. According to one preferable embodiment, the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner. Reference is made to WO 2006/069733 describing principles of such a continuous or semicontinuous preparation methods of the solid catalyst types, prepared via emulsion/solidification method.

The above described catalyst components are prepared according to the methods described in WO 01/48034.

In the following the present invention is further illustrated by means of examples.

EXAMPLES

1. Measuring Methods

The following definitions of terms and determination methods apply for the above general description of the invention as well as to the below examples unless otherwise defined.

Calculation of comonomer content of the second propylene-$C_4$ to $C_{12}$ α-olefin copolymer fraction (C-PP2):

$$\frac{C(PP) - w(PP1) \times C(PP1)}{w(PP2)} = C(PP2) \tag{I}$$

wherein
w(PP1) is the weight fraction [in wt.-%] of the first propylene-$C_4$ to $C_{12}$ α-olefin copolymer fraction (C-PP1),
w(PP2) is the weight fraction [in wt.-%] of the second propylene-$C_4$ to $C_{12}$ α-olefin copolymer fraction (C-PP2),
C(PP1) is the comonomer content [in wt.-%] of the first propylene-$C_4$ to $C_{12}$ α-olefin copolymer fraction (C-PP1),
C(PP) is the comonomer content [in wt.-%] of the propylene-$C_4$ to $C_{12}$ α-olefin copolymer fraction (C-PP),
C(PP2) is the calculated comonomer content [in wt.-%] of the second propylene copolymer fraction (R-PP2).

Calculation of the xylene cold soluble (XCS) content of the second propylene-$C_4$ to $C_{12}$ α-olefin copolymer fraction (C-PP2):

$$\frac{XS(PP) - w(PP1) \times XS(PP1)}{w(PP2)} = XS(PP2) \tag{II}$$

wherein
w(PP1) is the weight fraction [in wt.-%] of the first propylene-$C_4$ to $C_{12}$ α-olefin copolymer fraction (C-PP1),
w(PP2) is the weight fraction [in wt.-%] of the second propylene-$C_4$ to $C_{12}$ α-olefin copolymer fraction (C-PP2),
XS(PP1) is the xylene cold soluble (XCS) content [in wt.-%] of the first propylene —$C_4$ to $C_{12}$ α-olefin copolymer fraction (C-PP1), XS(PP) is the xylene cold soluble (XCS) content [in wt.-%] of the propylene-$C_4$ to $C_{12}$ α-olefin copolymer (C-PP), XS(PP2) is the calculated xylene cold soluble (XCS) content [in wt.-%] of the second propylene-$C_4$ to $C_{12}$ α-olefin copolymer fraction (C-PP2).

Calculation of melt flow rate $MFR_2$ (230° C.) of the second propylene-$C_4$ to $C_{12}$ α-olefin copolymer fraction (C-PP2):

$$MFR(PP2) = 10^{\left[\frac{\log(MFR(PP))-w(PP1)\times \log(MFR(PP1))}{w(PP2)}\right]} \quad \text{(III)}$$

wherein w(PP1) is the weight fraction [in wt.-%] of the first propylene-$C_4$ to $C_{12}$ α-olefin copolymer fraction (C-PP1), w(PP2) is the weight fraction [in wt.-%] of the second propylene-$C_4$ to $C_{12}$ α-olefin copolymer fraction (C-PP2), MFR(PP1) is the melt flow rate $MFR_2$ (230° C.) [in g/10 min] the first propylene-$C_4$ to $C_{12}$ α-olefin copolymer fraction (C-PP1), MFR(PP) is the melt flow rate $MFR_2$ (230° C.) [in g/10 min] of the propylene-$C_4$ to $C_{12}$ α-olefin copolymer (C-PP), FR(PP2) is the calculated melt flow rate $MFR_2$ (230° C.) [in g/10 min] of the second propylene-$C_4$ to $C_{12}$ α-olefin copolymer fraction (C-PP2).

Calculation of comonomer content of the elastomeric propylene copolymer (EC), respectively:

$$\frac{C(RAHECO)-w(PP)\times C(PP)}{w(E)} = C(E) \quad \text{(IV)}$$

wherein w(PP) is the weight fraction [in wt.-%] of the propylene-$C_4$ to $C_{12}$ α-olefin copolymer fraction (C-PP), i.e. polymer produced in the first and second reactor (R1+R2), w(E) is the weight fraction [in wt.-%] of the elastomeric propylene copolymer (EC), i.e. polymer produced in the third and optionally fourth reactor (R3+R4)

C(PP) is the comonomer content [in wt.-%] of the propylene-$C_4$ to $C_{12}$ α-olefin copolymer (C-PP), i.e. comonomer content [in wt.-%] of the polymer produced in the first and second reactor (R1+R2), C(RAHECO) is the comonomer content [in wt.-%] of the heterophasic propylene copolymer (RAHECO), C(E) is the calculated comonomer content [in wt.-%] of elastomeric propylene copolymer (EC), i.e. of the polymer produced in the third and optionally fourth reactor (R3+R4).

$MFR_2$ (230° C.) is measured according to ISO 1133 (230° C., 2.16 kg load).

Number Average Molecular Weight ($M_n$), Weight Average Molecular Weight ($M_w$) and Molecular Weight Distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Comonomer Content by NMR Spectroscopy

Quantitative nuclear-magnetic resonance (NMR) spectroscopy was used to quantify the tacticity, regio-regularity and comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. Standard single-pulse excitation was employed utilising the NOE at short recycle delays and the RS-HEPT decoupling scheme. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to regio defects and comonomer were observed.

The tacticity distribution was quantified through integration of the methyl region between 23.6-19.7 ppm correcting for any sites not related to the stereo sequences of interest. Specifically the influence of regio defects and comonomer on the quantification of the tacticity distribution was corrected for by subtraction of representative regio defect and comonomer integrals from the specific integral regions of the stereo sequences.

The isotacticity was determined at the triad level and reported as the percentage of isotactic triad (mm) sequences with respect to all triad sequences:

[mm]%=100*(mm/(mm+mr+rr))

where mr represents the sum of the reversible mr and rm triad sequences.

The presence of 2,1 erythro regio defects was indicated by the presence of the two methyl sites at 17.7 and 17.2 ppm and confirmed by other characteristic sites.

Characteristic signals corresponding to other types of regio defects were not observed.

The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary (1,2) inserted propene and all other present regio defects:

$$P_{total} = P_{12} + P_{21e}$$

The mole percent of 2,1 erythro regio defects was quantified with respect to all propene:

$$[21e] \text{ mol \%} = 100 * (P_{21e}/P_{total})$$

Characteristic signals corresponding to the incorporation of $C_{5-12}$ alpha-olefin were observed. The amount isolated $C_{5-12}$ alpha-olefin incorporated in $PPC_{5-12}PP$ sequences was quantified using the integral of the corresponding sites accounting for the number of reporting sites per comonomer.

The amount isolated 1-hexene incorporated in PPHPP sequences was quantified using the integral of the αB4 sites at 44.1 ppm accounting for the number of reporting sites per comonomer:

$$H = I[\alpha B4]/2$$

With sites indicative of consecutive incorporation not observed the total 1-hexene comonomer content was calculated solely on this quantity:

$$H_{total} = H$$

The amount isolated 1-octene incorporated in PPOPP sequences was quantified using the integral of the αB6 sites at 44.0 ppm accounting for the number of reporting sites per comonomer:

$$O = I[\alpha B6]/2$$

With sites indicative of consecutive incorporation not observed the total 1-octene comonomer content was calculated solely on this quantity:

$$O_{total} = O$$

Characteristic signals corresponding to the incorporation of ethylene were observed.

The amount isolated ethylene incorporated in PPEPP sequences was quantified using the integral of the Sαγ sites at 37.8 ppm accounting for the number of reporting sites per comonomer:

$$E = I[S\alpha\gamma]/2$$

The amount consecutively incorporated ethylene in PPEEPP sequences was quantified using the integral of the Sβδ site at 26.9 ppm accounting for the number of reporting sites per comonomer:

$$EE = IS\beta\delta$$

Sites indicative of further types of ethylene incorporation e.g. PPEPEPP and PPEEEPP were quantified from characteristic signals as EPE and EEE and accounted for in a similar way as PPEEPP sequences. The total ethylene comonomer content was calculated based on the sum of isolated, consecutive and non consecutively incorporated ethylene:

$$E_{total} = E + EE + EPE + EEE$$

The total mole fraction of comonomer in the polymer was calculated as:

$$f_E = (E_{total}/(E_{total} + P_{total} + C_{5-12;total})$$

$$f_{C5-12} = (E_{total}/(E_{total} + P_{total} + C_{5-12;total})$$

The mole percent comonomer incorporation in the polymer was calculated from the mole fraction according to:

$$[C_{5-12}] \text{ mol \%} = 100 * f_{C5-12}$$

$$[E] \text{ mol \%} = 100 * f_E$$

The weight percent 1-hexene and ethylene incorporation in the polymer was calculated from the mole fraction according to:

$$[H] \text{ wt \%} = 100*(f_H*84.16)/((f_E*28.05)+(f_H*84.16)+((1-(f_E+f_H))*42.08))$$

$$[E] \text{ wt \%} = 100*(f_E*28.05)/((f_E*28.05)+(f_H*84.16)+((1-(f_E+f_H))*42.08))$$

The weight percent 1-octene and ethylene incorporation in the polymer was calculated from the mole fraction according to:

$$[O] \text{ wt \%} = 100*(f_O*112.21)/((f_E*28.05)+(f_O*112.21)+((1-(f_E+f_O))*42.08))$$

$$[E] \text{ wt \%} = 100*(f_E*28.05)/((f_E*28.05)+(f_O*112.21)+((1-(f_E+f_O))*42.08))$$

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005 Jul., 01. The part which remains insoluble is the xylene cold insoluble (XCI) fraction.

The hexane extractable fraction is determined according to FDA method (federal registration, title 21, Chapter 1, part 177, section 1520, s. Annex B) on cast films of 100 μm thickness produced on a monolayer cast film line with a melt temperature of 220° C. and a chill roll temperature of 20° C. The extraction was performed at a temperature of 50° C. and an extraction time of 30 min.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 11357-3:1999 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step. All materials have more than one melting point, but one dominant one representing more than 50% of the total melting enthalpy.

The glass transition temperature Tg is determined by dynamic mechanical analysis according to ISO 6721-7. The measurements are done in torsion mode on compression moulded samples (40×10×1 mm³) between −100° C. and +150° C. with a heating rate of 2° C./min and a frequency of 1 Hz.

Tensile modulus in machine and transverse direction was determined according to ISO 527-1 at 23° C. on cast films of 50 μm thickness produced on a monolayer cast film line with a melt temperature of 220° C. and a chill roll temperature of 20° C. Testing was performed at a cross head speed of 1 mm/min.

Charpy notched impact strength is determined according to ISO 179 1 eA at 23°, and at −20° C. by using an 80×10×4 mm³ test bars injection molded in line with EN ISO 1873-2.

The stress-whitening was determined as described in detail in EP 1 860 147 A1 on injection-moulded UL94 specimens with the dimension of 125×12.5×2 mm (length×width×thickness).

The measurement of the stress whitening is performed in a reversed three point bending test on a universal testing machine (Zwick Z010) with a test speed of 50 mm/min. Definitions of technical terms (e.g. deflection, support, loading edge) in this specific test method are as described in ISO 178 (flexural test).

Two different parameters are determined:
i. Stress whitening angle [°] is the bending angle at which stress whitening occurs. The occurrence of stress whitening corresponds to a sharp drop of the optical response during bending at a specific deflection value.
ii. Residual stress whitening 90° [mm] is the residual size of the blushing zones immediately after a bending of 90°. Bending test is conducted to a bending angle of 90°. The specimen is then released with a crosshead speed of 400 mm/min. The length of the blushing area (measured parallel to the length direction of the sample) measured immediately after releasing is the Residual stress whitening 90°.

Mean particle size (d50) is measured with Coulter Counter LS200 at room temperature with n-heptane as medium, particle sizes below 100 nm by transmission electron microscopy.

2. Examples

The catalyst used in the polymerization processes for the heterophasic propylene copolymer (RAHECO) of the inventive examples IE1 and IE2 was the metallocene catalyst as described in example 10 of WO 2010/052263 A1.

CE1 is the commercial random propylene copolymer "Borpact SH950MO" of Borealis AG.

CE2 is the commercial random propylene copolymer "BorPure RG466MO" of Borealis AG.

CE3 is the commercial random heterophasic copolymer "BorSoft SD233CF" of Borealis AG.

TABLE 1

| Polymerization conditions | | IE 1 | IE 2 |
|---|---|---|---|
| Loop | | | |
| Temperature | [° C.] | 65 | 65 |
| Split | [%] | 34 | 36 |
| H2/C3 ratio | [mol/kmol] | 0.21 | 0.21 |
| C3/C6 ratio | [mol/kmol] | 8.8 | 8.8 |
| MFR$_2$ | [g/10 min] | 33 | 33 |
| XCS | [wt.-%] | 1.2 | 1.3 |
| C6 content | [wt.-%] | 1.2 | 1.2 |
| GPR 1 | | | |
| Temperature | [° C.] | 85 | 85 |
| Pressure | [kPa] | 2300 | 2300 |
| Split | [%] | 42 | 44 |
| H2/C3 ratio | [mol/kmol] | 1.0 | 1.3 |
| C3/C6 ratio | [mol/kmol] | 0.4 | 0.4 |
| MFR$_2$ | [g/10 min] | 34 | 44 |
| XCS | [wt.-%] | 1.5 | 1.2 |
| C6 content | [wt.-%] | 3.4 | 3.4 |
| GPR 2 | | | |
| Temperature | [° C.] | 80 | 80 |
| Pressure | [kPa] | 2500 | 2500 |
| Split | [%] | 24 | 22 |
| C2/C3 ratio | [mol/kmol] | 10727 | 10504 |
| H2 feed | [mol] | no | No |
| MFR$_2$ | [g/10 min] | 19 | 25 |
| XCS | [wt.-%] | 17.5 | 14.2 |
| C2 content | [wt.-%] | 19.4 | 19.2 |
| C6 content | [wt.-%] | 2.4 | 2.1 |

C2 ethylene
C6 1-hexene
H2/C3 ratio hydrogen/propylene ratio
C6/C3 ratio 1-hexene/propylene ratio
½ GPR ½ gas phase reactor
Loop Loop reactor

TABLE 2

| Properties | | IE 1 | IE 1a | IE 2 | IE 2a | CE 1 | CE 2 | CE 3 |
|---|---|---|---|---|---|---|---|---|
| MFR$_2$ | [g/10 min] | 19 | 19 | 25 | 25 | 26 | 30 | 7 |
| Tm(PE) | [° C.] | 135 | 135 | 128 | 128 | 102 | — | 111 |
| Hm(PE) | [J/g] | 3.2 | 3.0 | 4.0 | 3.8 | 1.1 | — | 0.4 |
| Tm(PP, 1) | [° C.] | 135 | 135 | 128 | 128 | 158 | 137 | 141 |
| Hm(PP, 1) | [J/g] | 3.2 | 3.5 | 3.5 | 3.7 | 1.1 | 62.8 | 59.8 |
| Tm(PP, 2) | [° C.] | 141 | 141 | 143 | 143 | 163 | 151 | 151 |
| Hm(PP, 2) | [J/g] | 70.0 | 77.8 | 71.5 | 78.8 | 69.9 | 28.3 | 1.9 |
| Tc | [° C.] | 96 | 116 | 97 | 112 | 109 | 112 | 100 |
| Tg(1) of M | [° C.] | 5.9 | 5.9 | 5.8 | 5.8 | 0.0 | −3.8 | −3.7 |
| Tg(2) of E | [° C.] | −31.8 | −31.8 | −31.8 | −31.8 | −54.0 | — | −50.0 |
| C2 total | [wt.-%] | 19.4 | 19.4 | 19.2 | 19.2 | 24.4 | 4.1 | 8.0 |
| C6 total | [wt.-%] | 2.4 | 2.4 | 2.1 | 2.1 | — | — | — |
| XCS | [wt.-%] | 16.6 | 16.6 | 13.6 | 13.6 | 16.4 | 9.0 | 20.0 |
| IV of XCS | [dl/g] | 1.8 | 1.8 | 1.8 | 1.8 | 1.7 | n.d. | 1.3 |
| C2 of XCS | [wt.-%] | 78.0 | 78.0 | 78.0 | 78.0 | 47.0 | n.d. | 39.0 |
| C2 of XCI | [wt.-%] | 4.6 | 4.6 | 4.6 | 4.6 | n.d. | n.d. | n.d. |
| C6 of XCI | [wt.-%] | 2.9 | 2.9 | 2.9 | 2.9 | — | — | — |
| C6 (FDA) 100 μm CF | [wt.-%] | 2.7 | n.d. | 1.7 | n.d | 3.7 | 2.8 | 4.0 |
| Tensile Modulus | [MPa] | 570 | 770 | 630 | 744 | 950 | 1050 | 500 |
| Charpy NIS. 23° C. | [kJ/m$^2$] | 9.8 | 7.6 | 6.6 | 8.1 | 7.9 | 3.9 | 10.0 |
| Charpy NIS. −20° C. | [kJ/m$^2$] | 3.4 | 2.1 | 2.1 | 2.1 | 2.0 | 1.0 | 1.0 |
| Haze | [%] | 41.7 | 20.5 | 46.8 | 22.1 | 55.6 | 17.7 | 68.0 |

IE 1a is nucleated with 0.2 wt % 1,3:2,4 di(methylbenzylidene) sorbitol (DMDBS, commercially available as Millad 3988 of Milliken Co., USA)
IE 2a is nucleated with 0.2 wt % of a mixture of aluminium-hydroxy-bis[2,2'-methylene- bis(4,6-di-t-butylphenyl)phosphate] and lithium myristate (commercially available as Adekastab NA-21 of Adeka Palmarole, France)
n.d.—not determined All polymer powders were compounded in a co-rotating twin-screw extruder Coperion ZSK 57 at 220° C. with 0.2 wt.-% of Irganox B225 (1:1-blend of Irganox 1010 (Pentaerythrityl-tetrakis(3-(3',5'-di-tert.butyl-4-hydroxytoluyl)-propionate and tris (2,4-di-t-butylphenyl) phosphate) phosphite) of BASF AG, Germany), 0.1 wt.-% calcium stearate and if present with 0.2 wt % of the nucleating agent Millad 3988 or Adekastab NA-21.

TABLE 3

| | Stress Whitening | |
| --- | --- | --- |
| | Res. SW@90° | SW angle |
| IE1 | 0.0 | 44.8 |
| IE1a | 0.0 | 62.6 |
| IE2 | 0.0 | 44.8 |
| IE2a | n.d. | n.d. |
| CE1 | 4.3 | 20.3 |
| CE2 | n.d. | n.d. |
| CE3 | n.d. | n.d. |

The invention claimed is:

1. Heterophasic propylene copolymer (RAHECO) comprising
  (i) a matrix (M) being a propylene-$C_4$ to $C_{12}$ α-olefin copolymer (C-PP), said propylene-$C_4$ to $C_{12}$ α-olefin copolymer (C-PP) comprises units derivable from
    (i.1) propylene and
    (i.2) at least one $C_4$ to $C_{12}$ α-olefin; and
  (ii) an elastomeric propylene copolymer (EC) dispersed in said matrix (M), said elastomeric propylene copolymer (EC) comprises units derivable from
    (ii.1) propylene and
    (ii.2) ethylene and optionally at least one $C_4$ to $C_{12}$ α-olefin;
  wherein said heterophasic propylene copolymer (RAHECO) has
  (a) a melt flow rate $MFR_2$ (230° C.) measured according to ISO 1133 in the range of 2.5 to 200.0 g/10 min;
  (b) a total comonomer content in the range of 12.0 to 35.0 wt.-%;
  (c) a xylene cold soluble (XCS) fraction determined according to ISO 16152 (25° C.) in an amount of 10.0 to 40.0 wt.-%;
  (d) a total comonomer content of the xylene soluble (XCS) fraction in the range of 50.0 to 90.0 wt.-%
  wherein said heterophasic propylene copolymer (RAHECO) fulfills
  (e) the in-equation (I)

$$\frac{C2(\text{total})}{Cx(\text{total})} > 1.0 \tag{I}$$

wherein
    C2(total) is the ethylene content [in wt.-%] of the heterophasic propylene copolymer (RAHECO);
    Cx(total) is the $C_4$ to $C_{12}$ α-olefin content [in wt.-%] of the heterophasic propylene copolymer (RAHECO)
  wherein said heterophasic propylene copolymer (RAHECO) comprises a xylene cold in-soluble (XCI) fraction, having one or more of:
  (f) a total comonomer content [in wt.-%] based on the weight of the xylene cold in-soluble (XCI) fraction in the range of 3.0 to 12.0 wt.-%;
  (g) an ethylene content [in wt.-%] based on the total weight of the xylene cold in-soluble (XCI) fraction in the range of 2.0 to 11.0 wt.-%;
  (h) a $C_4$ to $C_{12}$ α-olefin content [in wt.-%] based on the total weight of the xylene cold in-soluble (XCI) fraction in the range of 0.5 to 6.0 wt.-%;
  (i) fulfills the in-equation (II)

$$\frac{C2(XCI)}{Cx(XCI)} > 1.0 \tag{II}$$

wherein
    C2(XCI) is the ethylene content [in wt.-%] of the xylene cold in-soluble (XCI) fraction of the heterophasic propylene copolymer (RAHECO);
    Cx(XCI) is the $C_4$ to $C_{12}$ α-olefin content [in wt.-%] of the xylene cold in-soluble (XCI) fraction of the heterophasic propylene copolymer (RAHECO); or combinations thereof.

2. Heterophasic propylene copolymer (RAHECO) according to claim 1, wherein one or more of the following is fulfilled:
  (a) the ethylene content of the total heterophasic propylene copolymer (RAHECO) is in the range of 12.0 to 33.0 wt.-%, based on the weight of the heterophasic propylene copolymer (RAHECO);
  (b) the $C_4$ to $C_{12}$ α-olefin content of the total heterophasic propylene copolymer (RAHECO) is in the range of 0.5 to 6.0 wt.-%, based on the weight of the heterophasic propylene copolymer (RAHECO); or combinations thereof.

3. Heterophasic propylene copolymer (RAHECO) according to claim 1, wherein one or more of the following is fulfilled:
  (a) the propylene-$C_4$ to $C_{12}$ α-olefin copolymer (C-PP) is a propylene-1-hexene copolymer ($C_6$-PP);
  (b) the elastomeric propylene copolymer (EC) is an ethylene-propylene rubber (EPR); or a combination thereof.

4. Heterophasic propylene copolymer (RAHECO) according to claim 1, wherein the xylene cold soluble (XCS) fraction of the heterophasic propylene copolymer (RAHECO) has an intrinsic viscosity (IV) determined according to DIN ISO 1628/1 (in Decalin at 135° C.) of at least 1.2 dl/g.

5. Heterophasic propylene copolymer (RAHECO) according to claim 1 fulfilling one or more of:
  (a) the in-equation (III)

$$\frac{C(XCS)}{C(\text{total})} \geq 1.5 \tag{III}$$

wherein
    C(XCS) is the total comonomer content [in wt.-%] of the xylene cold soluble (XCS) fraction of the heterophasic propylene copolymer (RAHECO);
    C(total) is the total comonomer content [in wt.-%] of the total heterophasic propylene copolymer (RAHECO);
  (b) the in-equation (IV)

$$\frac{C2(XCS)}{C2(\text{total})} \geq 1.7 \tag{IV}$$

wherein
    C2(XCS) is the ethylene content [in wt.-%] of the xylene cold soluble (XCS) fraction of the heterophasic propylene copolymer (RAHECO);

C2(total) is the ethylene content [in wt.-%] of the total heterophasic propylene copolymer (RAHECO);
(c) the in-equation (V)

$$\frac{C2(XCS)}{C(XCI)} \geq 4.5 \qquad (V)$$

wherein
C2(XCS) is the ethylene content [in wt.-%] of the xylene cold soluble (XCS) fraction of the heterophasic propylene copolymer (RAHECO);
C(XCI) is the total comonomer content [in wt.-%] of the xylene cold in-soluble (XCI) fraction of the heterophasic propylene copolymer (RAHECO);
(d) the in-equation (VI)

$$\frac{C2(XCS)}{C2(XCI)} \geq 5.0 \qquad (VI)$$

wherein
C2(XCS) is the ethylene content [in wt.-%] of the xylene cold soluble (XCS) fraction of the heterophasic propylene copolymer (RAHECO);
C2(XCI) is the ethylene content [in wt.-%] of the xylene cold in-soluble (XCI) fraction of the heterophasic propylene copolymer (RAHECO); or combinations thereof.

6. Heterophasic propylene copolymer (RAHECO) according to claim 1, wherein the propylene-$C_4$ to $C_{12}$ α-olefin copolymer (C-PP) comprises a first polypropylene fraction (PP1) and a second propylene-$C_4$ to $C_{12}$ α-olefin copolymer fraction (C-PP2).

7. Heterophasic propylene copolymer (RAHECO) according to claim 6, wherein one or more of the following are fulfilled:
(a) the comonomer content [in wt-%] in the propylene-$C_4$ to $C_{12}$ α-olefin copolymer (C-PP) is higher than in the first polypropylene fraction (PP1);
(b) the comonomer content between the first polypropylene fraction (PP1) and the propylene-$C_4$ to $C_{12}$ α-olefin copolymer (C-PP) differ by at least 1.5 wt-%;
(c) the comonomer content between the first polypropylene fraction (PP1) and the second propylene-$C_4$ to $C_{12}$ α-olefin copolymer fraction (C-PP2) differ by at least 2.5 wt-%; or combinations thereof.

8. Heterophasic propylene copolymer (RAHECO) according to claim 6, wherein the first polypropylene fraction (PP1) is
(a) a propylene homopolymer fraction (H-PP1); or
(b) a first propylene-$C_4$ to $C_{12}$ α-olefin copolymer fraction (C-PP1).

9. Heterophasic propylene copolymer (RAHECO) according to claim 6, wherein one or more of the following is fulfilled:
(a) the $C_4$ to $C_{12}$ α-olefin content in second propylene-$C_4$ to $C_{12}$ α-olefin copolymer fraction (C-PP2) is in the range of 2.0 to 15.0 wt.-%;
(b) the comonomer content in the propylene-$C_4$ to $C_{12}$ α-olefin copolymer (C-PP) is in the range of 1.5 to 9.0 wt.-%; or combinations thereof.

10. Heterophasic propylene copolymer (RAHECO) according to claim 1, wherein the elastomeric propylene copolymer (EC) has a comonomer content in the range of 40 to 90 wt.-%.

11. Heterophasic propylene copolymer (RAHECO) according to claim 1 fulfilling in-equation (VIII)

$$\frac{C(\text{total})}{XCS} \geq 1.0 \qquad (VIII)$$

wherein
C(total) is the total comonomer content [in wt-%] of the heterophasic propylene copolymer (RAHECO);
XCS is the content [in wt. -%] of the xylene cold soluble (XCS) fraction of the heterophasic propylene copolymer (RAHECO).

12. Heterophasic propylene copolymer (RAHECO) according to claim 1 having a first glass transition temperature Tg(1) and a second glass transition temperature Tg(2), wherein said first glass transition temperature Tg(1) is above the second glass transition temperature Tg(2).

13. Heterophasic propylene copolymer (RAHECO) according to claim 1 having one or more of the following:
(a) a first glass transition temperature Tg(1) in the range of −5 to +12° C.;
(b) a second glass transition temperature Tg(2) in the range of −45 to −25° C.; or combinations thereof.

14. Heterophasic propylene copolymer (RAHECO) according to claim 1, wherein said heterophasic propylene copolymer (RAHECO) is α-nucleated.

15. Heterophasic propylene copolymer (RAHECO) according to claim 1 having
a tensile modulus measured according ISO 527-1 at 23° C. of at least 500 MPa.

16. A process for the preparation of a heterophasic propylene copolymer (RAHECO) comprising
(i) a matrix (M) being a propylene-$C_4$ to $C_{12}$ α-olefin copolymer (C-PP), said propylene-$C_4$ to $C_{12}$ α-olefin copolymer (C-PP) comprises units derivable from
(i.1) propylene and
(i.2) at least one $C_4$ to $C_{12}$ α-olefin; and
(ii) an elastomeric propylene copolymer (EC) dispersed in said matrix (M), said elastomeric propylene copolymer (EC) comprises units derivable from
(ii.1) propylene and
(ii.2) ethylene and optionally at least one $C_4$ to $C_{12}$ α-olefin;
wherein said heterophasic propylene copolymer (RAHECO) has
(a) a melt flow rate $MFR_2$ (230° C.) measured according to ISO 1133 in the range of 2.5 to 200.0 g/10 min;
(b) a total comonomer content in the range of 12.0 to 35.0 wt.-%;
(c) a xylene cold soluble (XCS) fraction determined according to ISO 16152 (25 ° C.) in an amount of 10.0 to 40.0 wt.-%;
(d) a total comonomer content of the xylene soluble (XCS) fraction in the range of 50.0 to 90.0 wt.-%;
wherein said heterophasic propylene copolymer (RAHECO) fulfills
(e) the in-equation (I)

$$\frac{C2(\text{total})}{Cx(\text{total})} > 1.0 \qquad (I)$$

wherein
C2(total) is the ethylene content [in wt.-%] of the heterophasic propylene copolymer (RAHECO);

Cx(total) is the $C_4$ to $C_{12}$ α-olefin content [in wt.-%] of the heterophasic propylene copolymer (RAHECO);

wherein said heterophasic propylene copolymer (RAHECO) comprises a xylene cold in-soluble (XCI) fraction, having one or more of:

(f) a total comonomer content [in wt.-%] based on the weight of the xylene cold in-soluble (XCI) fraction in the range of 3.0 to 12.0 wt.-%;

(g) an ethylene content [in wt.-%] based on the total weight of the xylene cold in-soluble (XCI) fraction in the range of 2.0 to 11.0 wt.-%;

(h) a $C_4$ to $C_{12}$ α-olefin content [in wt.-%] based on the total weight of the xylene cold in-soluble (XCI) fraction in the range of 0.5 to 6.0 wt.-%;

(i) fulfills the in-equation (II)

$$\frac{C2(XCI)}{Cx(XCI)} > 1.0 \qquad (II)$$

wherein

C2(XCI) is the ethylene content [in wt.-%] of the xylene cold in-soluble (XCI) fraction of the heterophasic propylene copolymer (RAHECO);

Cx(XCI) is the $C_4$ to $C_{12}$ α-olefin content [in wt.-%] of the xylene cold in-soluble (XCI) fraction of the heterophasic propylene copolymer (RAHECO); or combinations thereof;

the process comprising the steps of polymerizing:

(I) propylene and an $C_4$ to $C_{12}$ α-olefin so as to form the matrix (M) being the propylene-$C_4$ to $C_{12}$ α-olefin copolymer (C-PP); and subsequently polymerizing (II) propylene; ethylene; and optionally at least one $C_4$ to $C_{12}$ α-olefin so as to form the elastomeric propylene copolymer (EC) dispersed in said matrix (M);

wherein both steps (I) and (II) take place in the presence of the same single site solid particulate catalyst, the catalyst comprising (i) a complex of formula (I):

$$R_n(Cp')_2MX_2 \qquad (I)$$

wherein

"M" is zirconium (Zr) or hafnium (Hf), each "X" is independently a monovalent anionic σ-ligand, each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), "n" is 1 or 2 and (ii) a cocatalyst comprising a compound of a group 13 metal.

17. The process according to claim 16, wherein step (I) comprises polymerizing propylene and optionally a $C_4$ to $C_{12}$ α-olefin so as to form the first polypropylene fraction (PP1) and subsequently polymerizing in another reactor propylene and $C_4$ to $C_{12}$ α-olefin so as to form the second propylene-$C_4$ to $C_{12}$ α-olefin copolymer fraction (C-PP2), the first polypropylene fraction (PP1) and the second propylene-$C_4$ to $C_{12}$ α-olefin copolymer fraction (C-PP2) form the propylene-$C_4$ to $C_{12}$ α-olefin copolymer (C-PP).

18. An article comprising the heterophasic propylene copolymer (RAHECO) according claim 1, wherein the article is selected from the group consisting of a pouche, medical pouche, food packaging, film, bottle, and combinations thereof.

* * * * *